(12) United States Patent
Nemoto et al.

(10) Patent No.: US 6,890,373 B2
(45) Date of Patent: May 10, 2005

(54) ADSORBENTS, PROCESS FOR PRODUCING THE SAME, AND APPLICATIONS THEREOF

(75) Inventors: Yasushi Nemoto, Kanagawa (JP); Hisashi Mori, Kanagawa (JP); Tadashi Kuwahara, Kanagawa (JP)

(73) Assignee: Bridgestone Corporation, Tokyo (JP)

( * ) Notice: Subject to any disclaimer, the term of this patent is extended or adjusted under 35 U.S.C. 154(b) by 99 days.

(21) Appl. No.: 10/296,163

(22) PCT Filed: Jun. 13, 2001

(86) PCT No.: PCT/JP01/05010

§ 371 (c)(1),
(2), (4) Date: Jan. 17, 2003

(87) PCT Pub. No.: WO01/97965

PCT Pub. Date: Dec. 27, 2001

(65) Prior Publication Data

US 2003/0153457 A1 Aug. 14, 2003

(51) Int. Cl.$^7$ .............................................. B01D 53/04
(52) U.S. Cl. ................................. 95/90; 95/91; 95/116; 95/143; 96/117.5; 96/118; 96/135; 96/154; 55/385.6; 55/524; 210/504; 428/407; 502/402
(58) Field of Search ............................. 95/90, 91, 116, 95/117, 143; 96/108, 117.5, 118, 134, 135, 153, 154; 55/385.1, 524, 385.6, 385.7; 210/504, 506; 428/407; 502/402

(56) References Cited

U.S. PATENT DOCUMENTS

| | | | | | |
|---|---|---|---|---|---|
| 2,375,008 | A | * | 5/1945 | Lawrence .................. 428/407 |
| 2,638,179 | A | * | 5/1953 | Yard .............................. 96/14 |
| 3,544,507 | A | * | 12/1970 | Lloyd ......................... 523/206 |
| 3,953,657 | A | * | 4/1976 | Yamaguchi et al. ........ 428/406 |
| 4,076,892 | A | | 2/1978 | Fennimore et al. |
| 4,126,433 | A | * | 11/1978 | Forssberg et al. ............. 95/142 |
| 4,248,736 | A | * | 2/1981 | Fuchigami et al. .......... 502/402 |
| 4,337,294 | A | * | 6/1982 | Gunnell ....................... 428/407 |
| 4,687,573 | A | * | 8/1987 | Miller et al. ................. 210/143 |
| 4,764,424 | A | * | 8/1988 | Ganga et al. ............... 428/327 |
| 5,182,016 | A | * | 1/1993 | Funkenbusch et al. ... 210/198.2 |
| 5,224,972 | A | * | 7/1993 | Frye et al. ........................ 95/9 |
| 5,281,478 | A | * | 1/1994 | Hohner et al. .............. 428/404 |
| 5,639,550 | A | * | 6/1997 | Lisenko ...................... 428/404 |
| 5,721,187 | A | * | 2/1998 | Ogawa et al. .............. 502/417 |
| 5,853,690 | A | | 12/1998 | Hibino et al. |
| 6,030,704 | A | * | 2/2000 | Wilshaw et al. ............ 428/404 |
| 6,059,860 | A | * | 5/2000 | Larson ........................ 95/117 |
| 6,277,179 | B1 | * | 8/2001 | Reymonet .................... 96/153 |
| 6,391,429 | B1 | * | 5/2002 | Senkus et al. .............. 428/198 |
| 6,395,678 | B1 | * | 5/2002 | Summers et al. ........... 502/416 |
| 6,429,165 | B1 | * | 8/2002 | Nastke et al. ............... 502/159 |
| 6,458,458 | B1 | * | 10/2002 | Cooke et al. ................ 428/407 |
| 2003/0226443 | A1 | * | 12/2003 | Rajagopalan et al. ......... 95/133 |

FOREIGN PATENT DOCUMENTS

| | | |
|---|---|---|
| EP | 0635301 A2 * | 1/1995 |
| JP | 50-62884 | 5/1975 |
| JP | 2-233140 | 9/1990 |
| JP | 4-367722 | 12/1992 |
| JP | 7-90168 | 10/1995 |
| JP | 9-225299 | 9/1997 |

* cited by examiner

*Primary Examiner*—Robert H. Spitzer
(74) *Attorney, Agent, or Firm*—Manabu Kanesaka

(57) ABSTRACT

An adsorbent includes core particles containing an adsorbing material; a porous coating layer including a polymer material that coats the core particles; and an underlying layer containing a metal compound and disposed between the core particles and the porous coating layer. The porous coating layer is formed by spraying and applying a suspension or a solution containing the polymer material over the adsorbing material, or by immersing the adsorbing material into the suspension or the solution.

75 Claims, 15 Drawing Sheets baked at 345°C (×15,000)

before baking (× 1,500)

baked at 345°C (× 350)

baked at 345°C (×15,000)

baked at 325°C (×15,000)

baked at 365°C (×15,000)

baked at 375°C (×15,000)

Relative evaluation of integrated concentration of mercaptan

☐ Wall of commercially available clay material
▨ Wall of indoor ambient cleaning material Relative evaluation of integrated concentration of lower carboxylic acid ☐ Wall of commercially available clay material
▨ Wall of indoor ambient cleaning material Relative evaluation of integrated concentration of amines ▫ Wall of commercially available clay material ▨ Wall of indoor ambient cleaning material Relative evaluation of integrated concentration of mercaptan ▫ Wall of commercially available clay material ▨ Wall of indoor ambient cleaning material Relative evaluation of integrated concentration of lower carboxylic acid

- Wall of commercially available clay material
- Wall of indoor ambient cleaning material Relative evaluation of integrated concentration of amines

- Wall of commercially available clay material
- Wall of indoor ambient cleaning material Time for gas flow containing 3ppm of acetadehyde (minutes)

ADSORBENTS, PROCESS FOR PRODUCING THE SAME, AND APPLICATIONS THEREOF

BACKGROUND OF THE INVENTION

1. Field of the Invention

The present invention relates to adsorbents used for cleaning (deodorizing, decoloring and extracting impurities) of gases and liquids or for various other applications, methods for producing the same and applications thereof.

More specifically, the present invention relates to indoor ambient air cleaning members, methods for cleaning air, air cleaning devices, dehumidifying materials for inner gas of dual-glass window, drying agents for organic solvents, adsorbents for hard disk drives and freshness keeping member, all of which utilize the adsorbents.

The present invention also relates to ambiance humidity regulating members that provide controlled humidity of the ambiance when it is placed therein.

2. Related Prior Art

Adsorbents that are supported on a porous base member such as net sheets, fibers, foams and so on by utilizing binders and the like are known in the art. The adsorbents are utilized to carry out cleaning processing of gases and liquids. Since conventional adsorbent materials are porous materials themselves and have brittle surfaces, dust particles are generated upon exerting mechanical loads thereon, thereby contaminating the target gases and liquids with the dust particles.

The Japanese Patent Unexamined Publication No. H11-57,377 discloses that the contamination with the dust particles can be prevented by introducing an absorbing material within a vessel that sealingly contains a perforated sheet having permeability to air. However, breakage or pinhole tends to be occurred in the perforated sheet to easily release the generated dust particles.

Increasing capacity of and miniaturization of hard disk (hereinafter called as "HD"), one of storage devices, are rapidly advanced in recent years, and the levels of the requirements for the hard disk drive (hereinafter called as "HDD"), finished products of the HD, are increasing from year to year. The required performances for the HDD include better dehumidifying and maintaining cleanliness within the HDD. These performances are required because a contamination within the HDD generally leads to disk errors, damages of HD and damages of magnetic heads thereof. Therefore, it would be ideal to eliminate the contamination source such as organic gases from the interior of the HDD. However in reality, since the HDD includes a number of parts therein that contain adhesives for assembling thereof, contamination particles and gases are generated from the parts assembled therein or adhesives, thereby generally contaminating the interior of the HDD.

In order to prevent such contamination, technologies of adsorbing and removing the generated gases are disclosed. For example, the Japanese Application Unexamined Publications No. H10-321 and No. H11-57,377 disclose adsorbents in which an adsorbing material is closely packed within a container formed of porous PTFE (polytetrafluoroethylene) films. The adsorbents described in these Publications comprise an adsorbing material closely packed by PTFE films, for the purpose of removing the gases generated from the interior of the HDD by the adsorbing material and preventing the interior contamination from the generated particles with the adsorbing material.

More specifically, adsorbing materials having better adsorbability generally include microscopic pores on the surfaces, and therefore the surface portions of the adsorbing material may be easily broken when a certain amount of mechanical load is exerted onto the surface by collision or sliding occurred between the adsorbing materials, thereby generating the contaminating dust. Therefore, the adsorbing material should be closely packed within a package.

However, the resin materials used for the package thereof such as PTFE film and so on are highly electrically insulative and thus, in general, electrostatically charged. Therefore, when the container is formed by the insulative material such as PTFE film and the container pocket is filled with the adsorbing material such as activated carbon or silica gel, the adsorbing material may be scattered from the container or adhered on the inside surface of the container due to the electrostatics. In this reason, it is difficult to fully fill the container with the adsorbing material without leaving dead space therein. Accordingly, the bulk volume of the adsorbing material contained in the container becomes lower and thus the problem of lower volumetric efficiency occurs in the HDD in which miniaturization thereof is required.

In addition, there may be a risk of providing insufficient sealing since the contaminating particles may be adhered onto the sealing interface of the PTFE film when the adsorbing material is packed with the PTFE film, and thus there may be a risk of contaminating the interior of the HDD.

Further, the base material of porous PTFE film for container is required to have a certain level of mechanical strength for forming the porous PTFE film to a container, and thus a corresponding thickness should be required. On the other hand, increasing the thickness of the porous film may be a factor for adversely affecting the permeability to air. In this case, there is no choice other than that the mechanical strength should be given priority over the air permeability. Thus, the adsorbability of the adsorbent contained in the container having less air permeability is, in turn, decreased.

Similar problems related to the adsorbing material and the container occur in other applications. Plants such as fruits, vegetables, flowers and so on (hereinafter called as "vegetables") emit a trace amount of ethylene gas. The presence of ethylene gas in the storage atmosphere accelerates aging of vegetables, thereby deteriorating the freshness of the vegetables.

Japanese Application Unexamined Publication No. H02-138,935 discloses the materials for keeping freshness of the vegetables that adsorb and/or dissociate ethylene gas by activated carbon, zeolite, palladium supported carbon black or so on to keep freshness of the vegetables.

Since carbon black is a very fine powder, the carbon black may be easily scattered to easily blacken the vegetables.

Activated carbon and zeolite also easily create fine contaminating particles when they are in friction, and smudge the vegetables.

Further, since the vegetables also emit water vapor as well as ethylene gas, water condensation dew is easily generated on an interior surface of a bag container for storing vegetables. The condensed water, in turn, wets the adsorbing material such as activated carbon and zeolite, thereby significantly deteriorating the adsorbability for ethylene gas having hydrophobic nature.

SUMMARY OF THE INVENTION

The object of the present invention is to provide: an adsorbent of dust free and a method for producing thereof;

and an interior ambient air cleaning member, a method for cleaning air, an air cleaning device, a dehumidifying material for inner gas of dual-glass window, a drying agent for organic solvent, an adsorbent for hard disk drives and a freshness-keeping material, all of which utilizes the adsorbent.

Another object of the present invention is to provide an ambiance humidity regulating member having better ability of adsorbing and releasing moisture and ability of maintaining thereof.

The adsorbent according to the present invention comprises core particles including an adsorbing material, and a porous coating layer consisting of a polymer material that coats the core particle.

The method for producing the adsorbent according to the present invention comprises a step of forming a coating layer by applying a liquid containing a polymer material onto the surface of the particles.

The porous coating layer covering the core particles according to the present invention is capable of capturing the contaminating dust to be generated from the adsorbing material of the core particles, thereby preventing the generation of the dust particles from the adsorbent. The material to be adsorbed enters via the pore of the porous coating layer, and is adsorbed by the adsorbing material of the core particles.

The porous coating layer is very thin, so that the volume of the adsorbent is not substantially increased.

The adsorbent according to the present invention may include an underlying layer having particles of a metal compound disposed between the core particles and the porous coating layer. In this configuration, the color of the adsorbing material may transit to a color of the metal compound by the presence of the underlying layer including the metal compound particles, thereby obtaining the adsorbent having desired color.

The adsorbent according to the present invention may comprise one-dimensional structure, two-dimensional structure or three-dimensional structure having core particles, which are fixed thereon and have the porous coating layer formed thereon.

The adsorbent according to the present invention may be utilized for an indoor ambient air-cleaning member by selecting the adsorbent to have an adsorbability for adsorbing toxic gases present within the indoor ambience. More specifically, the indoor ambient air cleaning member according to the present invention includes core particles which have an adsorbing ability for toxic gases and which are coated with a porous coating layer.

Cleaning of air may be accomplished by filling the vessel with the adsorbent according to the present invention, and then flowing air through the vessel. The vessel may be a cylindrical vessel. The adsorbent may be allowed to freely move within the vessel during the process of flowing air. The vessel may be located in the standing position, or in the tilted position. If the vessel is in the tilted position, the free movement of the adsorbent is further promoted.

The adsorbent according to the present invention may be utilized for a dehumidifying material for inner gas of dual-glass window. Here, the dual-glass window has two glasses disposed in a mutually facing manner and being enclosed by a frame, in which air is sealingly encapsulated therebetween. The benefit of the dual-glass window is to provide better acoustic insulation and better heat insulating properties than single glass window. According to the benefit stated above, the dual-glass window has been employed for aircrafts, in which the temperature difference between the inside and the outside of the window is large. Recently, the application of the dual-glass window diverges to the glass window for houses, in particular houses of the cold districts and the noise pollution districts.

Haze and condensation of the inside of the dual-glass window is prevented by sufficiently drying the air encapsulated between two glasses with the dehumidifying material for inner gas of dual-glass window according to the present invention.

The adsorbent according to the present invention can also be used for a drying agent for organic solvents. In this application, the porous coating layer should be capable of being resistant to the organic solvents.

The adsorbent according to the present invention can also be used for an adsorbent for hard disk drives. A first aspect of the adsorbent for hard disk drives according to the present invention comprises the above-described adsorbent of the invention, and a planar sheet or a three-dimensional structure to which the adsorbent is fixed. A second aspect of the adsorbent for hard disk drives according to the present invention comprises the above-described adsorbent of the invention, and an air permeable material wrapping the adsorbent.

The adsorbent according to the present invention can also be used for a freshness-keeping material for fruits, vegetables, living flowers and so on. In this application, the porous coating layer repels water drops to prevent wetting out of the surface of the core particles with the water drops.

The adsorbent according to the present invention can also be used for an ambience humidity-regulating member. The ambiance humidity regulating member according to the present invention may include: core particles containing at least one humidity regulating material selected from the group consisting of organic acids, organic acid salts, inorganic acids and inorganic acid salts; and a porous coating layer including a polymer material coating the core particles.

In the ambience humidity regulating material, the core particles containing organic acids, inorganic acids and the salts thereof that have humidity regulating ability can be covered with the porous coating layer having water vapor permeability, so that the porous coating layer captures the deliquescent material of the core particles or liquids such as water adsorbed into the core particles by the porous coating layer to prevent the leakage of the deliquescent material or the liquids, without deteriorating the humidity regulating ability thereof.

The ambience humidity-regulating member can also be used together with the aforementioned adsorbent of the present invention, and in this case a functional ambience humidity-regulating member additionally having an adsorbability is presented.

DESCRIPTION OF THE PREFERRED EMBODIMENTS

Figure 1:
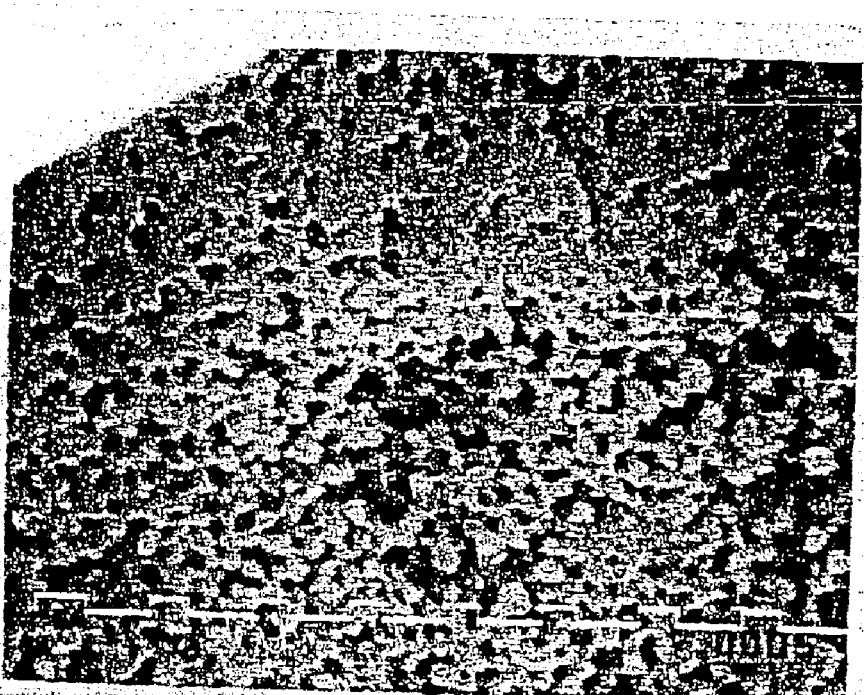
FIG. 1 is a scanning electron microscope photograph (magnitude: ×15,000) of the adsorbent that was obtained in Example 3.

The adsorbent according to the present invention includes core particles containing adsorbing material and porous coating layer comprising polymer material that covers the core particles.

The adsorbing material composing the core particles may preferably be selected from, and not limited to, a group consisting of activated carbon, inorganic oxides, acids, salts, compounds having ion exchange capacity and a modified compound thereof. The core particles may be an anion exchange resin or a cation exchange resin. The core particles may also be a chemical deodorizer such as $TiO_2$, $SiO_2$, $ZrO_2$, ZnO and so on. The inorganic oxides may be at least one selected from a group consisting of silica gel, alumina gel, zeolite (zeolite may be molecular sieves), diatomaceous earth and iron oxide. Acids and the salts thereof may adsorb moisture. Further, the compounds having ion exchange capacity may be at least one selected from a group consisting of chitosan, dextran sulfate, polyallylamine, sulfonated polystyrene resins, polyacrylic acid, polymethacrylic acid and derivatives thereof.

Two or more adsorbing materials may be simultaneously used for one application. For example, when a mixture of activated carbon and silica gel is used, activated carbon functions as adsorbing organic compounds, and silica gel functions as adsorbing moisture.

The core particles may support materials having reactivity and affinity with compounds to be adsorbed. For example, the potassium hydroxide supported core particles may be preferably used for adsorbing acid gases such as sulfurous acid. The core particles, that support water adsorbing organic compounds such as carbodiimide or salts of alkali metals such as calcium chloride or alkali earth metals such as magnesium sulfate, have better water adsorbing ability.

The core particles may have a form of fine particles, powder, granule, pills or beads, and also may be tablets prepared by tableting the powder or the granule.

The mean particle size of the core particles may be 0.01 mm to 100 mm, and, in particular, may preferably be within 0.1 mm to 10 mm, in view of providing better adsorbability. More specifically, the core particles having mean particle size of smaller than 0.01 mm may lead to obtaining lower ratio of the core particles to the polymer porous layer, thereby decreasing the adsorbability. The core particles having mean particle size of greater than 100 mm may provide difficulty of the materials to be adsorbed diffusing to the core portion thereof.

The shape of the core particles is not particularly limited, and may also be any shape such as amorphous (crushed particles), true sphere, elliptical capsule, rugby ball shape, cube, cuboid and so on.

The polymer material for composing the porous coating layer may typically be fluororesins, polyamide resins, polyimide resins, polyester resins, polystyrene resins, polyolefin resins, polycarbonate resins, polysulfone resins, acrylic resins, cellulose resins, vinyl chloride resins, polyacetal resins, polyurethane resins, copolymers thereof or derivatives thereof. Fluororesins may typically include polytetrafluoroethylene, polyhexafluoropropylene, polydifludroethylene, polyvinyliden fluoride, polyvinyl fluoride, copolymers thereof and so on, although the polymer material is not limited thereto.

A single polymer material may be used. Or blended two or more polymer materials may be used for one application.

The porous coating layer comprising the polymer material may be colored.

The film thickness of the porous coating layer may preferably be 0.01 μm to 1,000 μm, more preferably 1 μm to 100 μm, and most preferably 1 μm to 50 μm.

The pore diameter of the porous coating layer may preferably be 0.01 μm to 50 μm, and more preferably 0.01 μm to 10 μm, in view of allowing the material to be adsorbed passing therethrough and blocking the contaminating dust. Excessively large pore diameter may provide failing the block of the contaminating dust generated from the adsorbing materials, and excessively small pore diameter may provide higher transit resistance therebetween of the material to be adsorbed.

The porous coating layer may preferably have a porosity of within a range of 3% to 90%.

The porosity of the porous coating layer may be determined by a measurement method comprising: immersing the adsorbent having the coating layer into ethanol; thereafter washing the adsorbent; then introducing the adsorbent into liquid nitrogen to obtain a membrane-frozen condition of the coating layer; carefully peeling the porous coating layer off from the core particles and thereafter picking up the peeled porous coating layer by a careful manual operation with forceps, so as not to break the porous coating layer; and measuring the porosity of the obtained porous coating layer via a mercury injection method and an ethanol substituting water contents weight measurement method.

The porous coating layer including the polymer material can be formed on the surface of the core particles by adhering a liquid containing the polymer material onto the core particles. The liquid may be a solution of the polymer material, or a suspension of the polymer material. The suspension may be a dispersion or an emulsion. The liquid can preferably be adhered onto the core particles by spray-coating the liquid onto the core particles, or carrying out the single process or the repetitive processing of immersing the core particles into the liquid.

In the case of spray coating of the liquid, the liquid can be sprayed and adhered onto the core particles uniformly by fluidizing the core particles within the airflow.

During or after the process of forming the porous coating layer, at least one of a process for heating the core particles or a process of decreasing the pressure of the vessel containing the core particles may be carried out to draw the porous coating layer. Alternatively, a heating process may be carried out so that the coating layer partially shrinks and partially expands. For example, the adsorbent may be heated during or after the process of forming the porous coating layer comprising polytetrafluoroethylene resin, or the vessel containing the adsorbent therein may be depressurized, so that the air trapped within the core particles expands, and thus the coating layer also extends, and accordingly the coating layer becomes porous. The coating layer may also be formed by a baking process in which the adsorbent is heated.

In the case of using the polytetrafluoroethylene that has a tendency of fibrillating when drawn, the formed coating layer may be thermally processed to create mud cracks on the coating layer, thereby providing better air permeability. The thermal processing may also provide an aggregation of the fibers formed in the mud crack apertures and having an ability of capturing the dust. Thus, a single process of forming the coating layer can provide the coating layer having a thickness of up to 100 μm. However, in general, it is preferable to form the coating layer to a thickness of equal to or less than about 20 μm via a single processing step and a plurality of processing steps of forming the coating layer may be carried out, and between the forming steps, the thermal processing and/or the depressurizing processing may be carried out. The method having these processing steps prevents the creation of the mud cracks, and allows that the particles of the polymer material fine powder can be mutually fused only at the contacting point thereof, thereby providing the porous polymer layer having uniform micro porosity over the entire surface.

When the thermal processing is carried out after the processing of the coating layer, the thermal processing may be preferably carried out at a lower temperature than the melting point of the polymer material of the porous coating layer, since the processing at such temperature can provide higher rate of hole area over the surface and higher porosity can be maintained to provide higher air permeability, i.e., higher adsorbability. The temperature for the thermal processing may preferably be selected to a temperature between the melting point of the polymer material ($m_p$) and a temperature of 100° C. lower than the melting point ($m_p$−100° C.)

The permeation of the liquid containing the polymer material into the micro pores of the core particles can be prevented by creating the water-containing condition or the oil impregnation condition of the core particles, or the frozen state of these conditions, before contacting the core particles to the liquid.

The liquid of the polymer material may additionally include pore-forming agents, suspension stabilizers or emulsifiers.

The phase separation of the pore-forming agents from the polymer material occurs when the coating layer is formed. The pore-forming agents of the invention may typically include a water-soluble polymer or oligomer, or an oil soluble polymer or oligomer. The water-soluble polymers or oligomers may be at least one selected from the group consisting of cellulose, poly(oxyoletin), polyvinylpyrrolidone, polyvinyl alcohol, saponification compounds of polyvinyl acetate, polyacrylic acid, polymethacrylic acid and derivatives thereof, and particularly preferably at least one selected from the group consisting of methyl cellulose, hydroxy methyl cellulose, hydroxy ethyl cellulose, hydroxy propyl cellulose, polyvinylpyrrolidone, polyvinyl alcohol, polyethylene glycol, polypropylene glycol, and derivatives thereof. The oil soluble polymers may be liquid paraffin. At least a part of these pore-forming agents may be removed during or before the process of forming the coating layer to create the pores at locations of the pore-forming agents being formerly located, thereby providing improved porosity, distribution of the pore aperture diameter, pore aperture shape and so on. The methods of removing the pore-forming agents may typically include extraction process, sublimation process and combustion process.

The types and concentrations of the polymer materials, the pore-forming agents or other additives contained in the polymer solution or the suspension solution used for forming the coating layer may be suitably selected corresponding to the pore diameter, film thickness, porosity and the like of the porous polymer layer to be formed.

The adsorbent according to the present invention adsorbs and removes the impurities contained in the various gases and liquids. The adsorbent does not emit any dust derived by the adsorbing material itself.

The following are descriptions of the preferred embodiments according to the present invention.

EXAMPLE 1

A circular cylinder of a diameter of 300 mm and having a mesh having opening dimension of 0.297 mm at the bottom thereof was set standing normally. Core particles of activated carbon of between 20-mesh and 10-mesh were introduced into the circular cylinder, and thereafter dry air of 160° C. was flowed from the bottom thereof at a volumetric flow rate of 3 L/sec., to promote the convection movements of the activated carbon particles. A spray nozzle having a nozzle diameter of 2.5 mm was mounted to the central portion of the bottom mesh. A suspension containing: 6 parts by weight of polytetrafluoroethylene; 5 parts by weight of nonionic surfactant (e.g., oxy ethylene oxy propylene co-polymer and so on); and 89 parts by weight of water was sprayed to the convection-moving activated carbon from the nozzle for 0.2 second, and then the sprayed activated carbon was dried for 60 seconds. The operation was repeated for 100 times to form the coating layer having an average film thickness of about 50 $\mu$m onto the surface of the activated carbon. The activated carbon particles were immersed into a water-methanol solution mixture (containing 30 parts by weight of water and 70 parts by weight of methanol) for 10 minutes to extract and remove the nonionic surfactant that had been mixed into the suspension therefrom. Thereafter, the activated carbon was dried within an atmosphere of 110° C. Then, the activated carbon was introduced into a powder dryer, where the activated carbon was heated at a condition in which the particle surface temperature of the activated carbon was increased from 110° C. to approximately 325° C. at a heating rate of 10° C./min., and the activated carbon was held at the temperature of 325° C. for 3 minutes so that polytetrafluoroethylene of the surface of the activated carbon particles was baked out. After that, the activated carbon was washed with methanol and ultra pure water to obtain the adsorbent of the present invention.

In the present embodiment, the coating layer was drawn by expanding the air trapped within the activated carbon particles during the increase of the temperature in the heating process within the powder dryer to form the porous coating layer on the adsorbent having fibrous constitution. Average thickness of the porous coating polymer layer of the adsorbent was 50 $\mu$m.

10 g of the adsorbent was washed with ultra pure water, and measurements of the washing ultra pure water were conducted with time during the washing process via laser diffraction particle size distribution meter, in order to detect fine particles having diameter of 0.3 $\mu$m to 10 $\mu$m. The fine particle, however, was not detected.

10 g of the adsorbent was introduced into a dust free clean bag (volume: 1 L) and the bag was sealed except that two inserts for two cannulas were unsealed. High purity nitrogen was introduced from one cannula at a volumetric flow rate of 0.5 L/min. while the bag was vibrated. The exhaust gas discharged via another cannula was measured via a general purpose particle counter in order to detect fine particles having diameter of 0.3 $\mu$m to 10 $\mu$m. The fine particle, however, was not detected.

Then, a mixed nitrogen gas containing 0.1 ppm of toluene was introduced into the bag at a volumetric flow rate of 0.1 L/min., and the concentration of toluene in the exhaust gas was measured with time. It was confirmed that about 10% to 50% of toluene gas was removed by the adsorbent, 30 minutes after commencing the introducing the mixed nitrogen gas.

EXAMPLE 2

Core particles of activated carbon of between 20-mesh and 10-mesh were immersed within water, and air trapped within the micro pores of the activated carbon particles was degassed by applying ultrasonic vibration. The activated carbon particles were recovered on a mesh, and then the particles were introduced to liquid nitrogen one by one to form a layer of water ice having layer thickness of about 10 $\mu$m on the surface of the activated carbon particles. Then, the activated carbon particles having the water ice layer thereon were immersed for 1 second within a solution comprising: 1 part by weight of polycarbonate segment thermoplastic polyurethane resin; 1 part by weight of polyvinylpyrrolidone; 1 part by weight of hydroxy methyl cellulose; and 97 parts by weight of dimethyl formaldehyde, and immediately after that, the activated carbon particles were transferred to a solution comprising 40 parts by weight of dimethyl formaldehyde and 60 parts by weight of water. It was found that a white polymer coating layer was formed on the activated carbon particles surface. The activated carbon particles were washed in the flowing water for 3 hours to extract and remove hydroxy methyl cellulose with water, and then was dried at 70° C.

The porous coating layer of the resultant adsorbent had an anisotropic constitution having a fine skin layer formed on the support layer of a finger constitution. The average film thickness of the skin layer was approximately 5 $\mu$m, and the average film thickness of the support layer was approximately 50 $\mu$m. The average pore diameter of the skin layer was 0.1 $\mu$m, and the average pore diameter of the finger portion of the support layer was distributed between 10 $\mu$m and 50 $\mu$m.

The measurements of detecting the generation of the fine particles during the washing with water and detecting the generation of the fine particles during the gas flow were conducted, and it was found that the dust particles were not generated in both measurements. Further, the toluene adsorbability of the adsorbent was evaluated, and it was found that the adsorbent of the present example had a toluene gas adsorbability equivalent to that of the Example 1.

EXAMPLE 3

350 g of core particles of crushed activated carbon (between 20-mesh and 14-mesh) produced from the palm shell were introduced to a powder coating machine ("MP-01", commercially available from POWREX CORPORATION), and the activated carbon particles were convected at air feeding temperature of 60° C., air feeding flow rate of 80 m$^3$/hr., and revolution speed of a tri-blade bottom rotor of 300 rpm to create convectional movement.

On the other hand, a suspension of polytetrafluoroethylene resin fine powder ("POLYFRON D-1", commercially available from DAIKIN INDUSTRIES Co., Ltd.) was diluted with distilled water to prepare a suspension containing solid contents of 20% wt. 150 g of the suspension was sprayed along the tangential direction of the rotating bottom rotor over the convecting activated carbon particles at an injection rate of 9.5 g/min. from a dual fluid nozzle having a nozzle diameter of 1.2 mm. The first coating process was completed when the exhaust temperature was increased to 50° C. after the spraying process was completed.

The processed particles were recovered from the powder coating machine, and the particles were observed via optical microscopy and scanning electron microscopy. The observation showed that the entire surface of the activated carbon particles was covered with particles of polytetrafluoroethylene resin fine powder having particle size of about 0.1 $\mu$m. The cutting cross sectional plane thereof was also observed via scanning electron microscopy, and confirmed that the thickness of the coating layer was about 5 μm.

These particles were baked in the auger-built-in rotary kiln at 345° C. for about 5 minutes, and 350 g of the baked particles were processed via the aforementioned coating and baking processes again, to obtain the adsorbent of the present invention. The resultant adsorbent was observed via optical microscopy and scanning electron microscopy, and it was confirmed that the particles of polytetrafluoroethylene resin fine powder having particle size of approximately 0.1 μm were mutually fused at the contacting point thereof to form the porous film. FIG. 1 shows the scanning electron microscope photograph of the adsorbent (magnitude: ×15,000).

On the surface image of the scanning electron microscope photograph, an image processing was carried out, in which the surface area that was not occupied by the fine powder particles was assumed to be the area of the aperture, and the aperture diameter of the surface was calculated to be 0.05 μm to 0.1 μm. Further, it was confirmed that value of the calculated aperture diameter of the cutting cross sectional plane was approximately identical to the value of the calculated aperture diameter of the surface according to the image processing for the image of the cutting cross sectional plane. It was also confirmed that the entire surface of the activated carbon particles was substantially uniformly covered with polytetrafluoroethylene resin fine powder. The thickness of the coating layer was also calculated to be about 10 μm to 20 μm from the scanning electron microscope photograph image of the cutting cross sectional plane.

Further, the porosity measured via the aforementioned porosity measurement method was 50%.

[Evaluating Tests for the Adsorbability]

The adsorbability of the adsorbent was evaluated by measuring the gas adsorbability for two types of materials: toluene and acetaldehyde, according to the following method.

A column was prepared by filling the glass tube having a diameter of 14 mm with 1 g of non-treated activated carbon and 1 g of the above-mentioned adsorbent. A mixed gas containing 50 ppm of toluene or 50 ppm of acetaldehyde with a carrier gas of nitrogen was flowed through the column at a volumetric flow rate of 1 L/min., and the gas concentrations both at the inlet and at the outlet were monitored by using gas detection tube "121L", and "92M", both of which were commercially available from GASTECH CORPORATION, and the difference of the concentrations between the inlet and the outlet was calculated to obtain removal ratio.

Figure 2A:
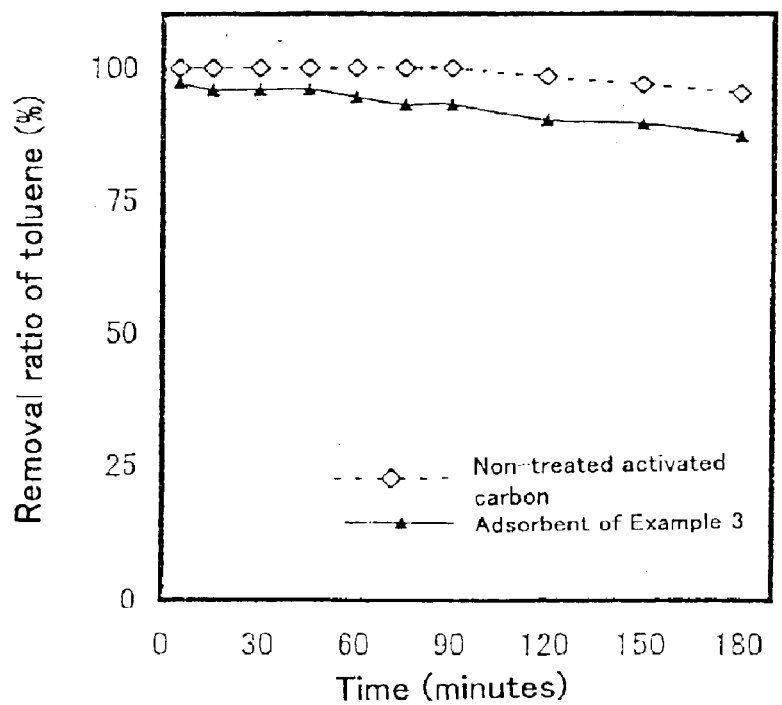
FIGS. 2A and 2B are graphs showing the results of the evaluation of the adsorbability that was carried out in Example 3.
Figure 2B:
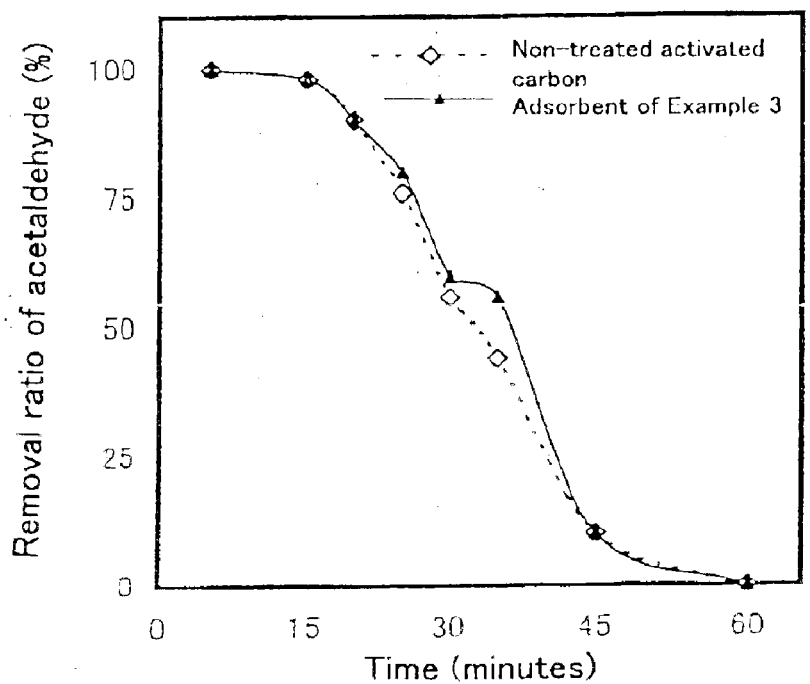

The results are shown in FIG. 2A and FIG. 2B, and these results show that the produced adsorbent had an adsorbability that is substantially equivalent to the activated carbon without coating with the porous coating layer of polytetrafluoroethylene resin. Therefore, the coating layer of the polytetrafluoroethylene resin on the adsorbent has better air permeability.

[Evaluation on the Ability of Capturing Contamination Dusts]

The ability of capturing contamination dusts of the adsorbent was evaluated by the following method.

700 grains of the above mentioned adsorbent particles were exposed to the gas flow of ultra pure nitrogen (flow rate: 1 L/min.) within a clean circular cylindrical vessel having a diameter of 14 mm, and the number of particles within the recovered nitrogen gas was counted by a PM counter ("KG-10", commercially available from LION CORPORATION). The result shows that any contamination carbon dust having diameter of not smaller than 0.3 μm was not found, and thus it was confirmed that the adsorbent did not cause a problem of creating contamination dust. On the other hand, non-treated activated carbon particles were also evaluated by the similar method, and 77,451+/−1,959 (per 0.1 QF) of particles having diameter of 0.3 μm to 0.5 μm were observed, and thus confirmed that the non-treated activated carbon caused a problem of creating contamination dust.

The coating process similar to one carried out in Example 3 was conducted except that the spraying amount of the suspension of the polytetrafluoroethylene resin fine powder before baking was set to 1,200 g, to prepare activated carbon particles coated with polytetrafluoroethylene resin fine powder.

Figure 3:
FIG. 3 is a scanning electron microscope photograph (magnitude: ×1,500) of the coated activated carbon particle that was obtained in Example 4.

The cutting cross sectional plane of the resultant activated carbon particles coated with polytetrafluoroethylene resin fine powder was observed by scanning electron microscope, and based on the observation, the thickness of the formed coating layer was calculated to approximately 100 μm. FIG. 3 shows a scanning electron microscope photo (magnitude: ×1,500) of the coated activated carbon particle.

Figure 4:
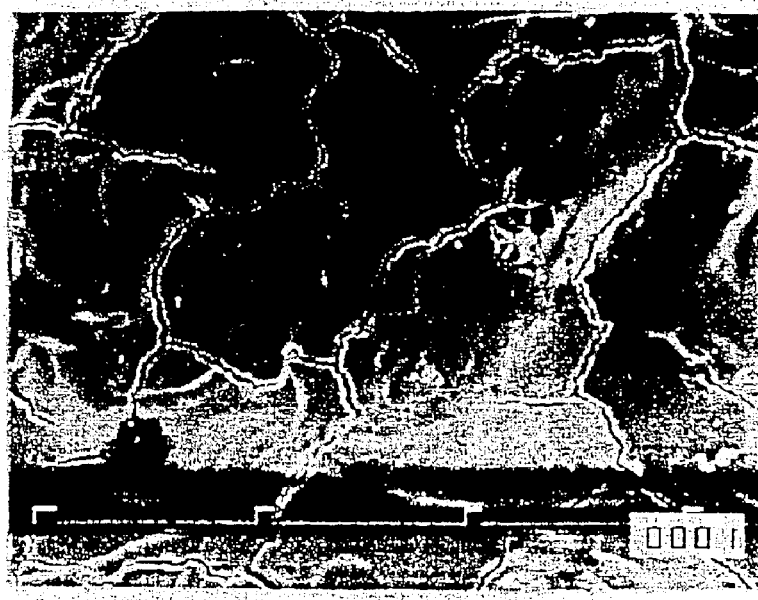
FIG. 4 is a scanning electron microscope photograph (magnitude: ×350) of the adsorbent that was obtained in Example 4.
Figure 5:
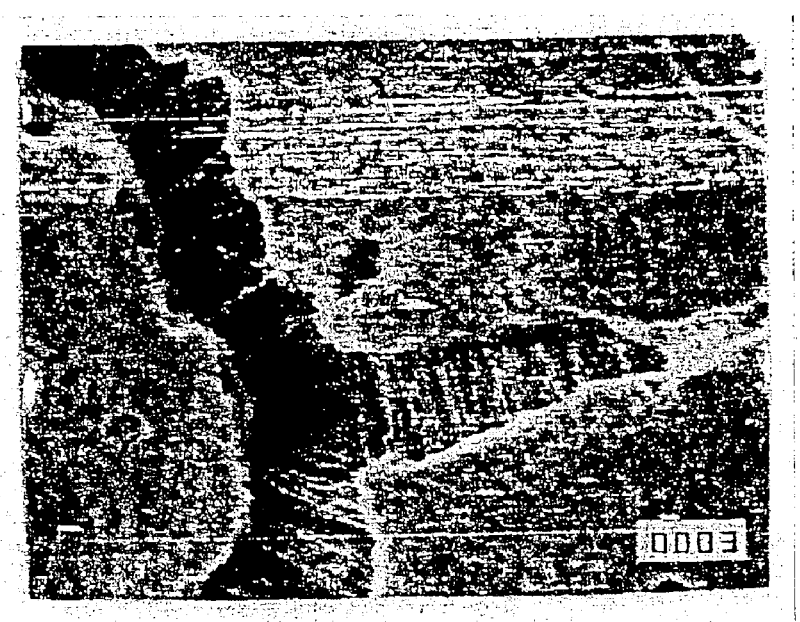
FIG. 5 is a scanning electron microscope photograph (magnitude: ×15,000) of the adsorbent that was obtained in Example 4.

The coated activated carbon particles were baked at the condition identical to the condition of Example 3, and found that, although a number of mud cracks were generated in the coating layer, fibrous agglomerations of polytetrafluoroethylene resin were formed within the opened slit of the crack by the drawing effect thereof. The scanning electron microscope photographs of the coated activated carbon particles after processed by the baking processing were shown in FIG. 4 (magnitude: ×350) and FIG. 5 (magnitude: ×15,000).

The adsorbent having mud cracks therein via such manner was evaluated on the ability of capturing contamination dusts by the method similar to example 3, and the results of the evaluation showed that no particle having diameter of not smaller than 0.3 μm was found or just 10+/−1 (per 0.1 QF) particles having diameter of 0.3 μm to 0.5 μm were found. These results indicate that substantially no contamination dust was generated although the cracks were created in the coating layer. It is presumed that the reason of these results was that the fibrous agglomeration formed in the slit of the cracks captured the contamination dust. More specifically, in the case of polytetrafluoroethylene resin, mud cracks were generated during the baking process when the thickness of the coating layer was thick, and then fibrous agglomerations of polytetrafluoroethylene resin were formed within the opened slit of the mud cracks by the drawing effect thereof. The fibrous agglomeration captures the carbon dust generated from the activated carbon particles. On the other hand, the mud cracks provide other advantage of better air permeability, and therefore the adsorbent has improved adsorbability.

EXAMPLES 5–7 AND COMPARATIVE EXAMPLE 1

Figure 6:
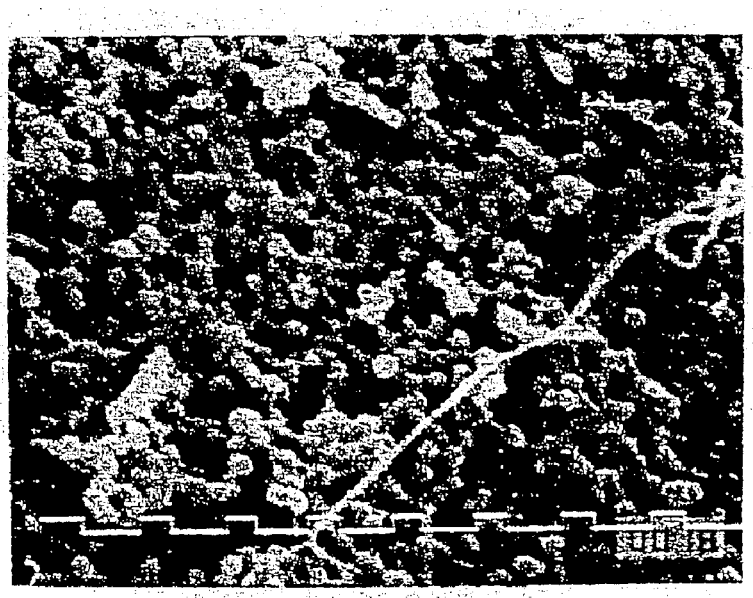
FIG. 6 is a scanning electron microscope photograph (magnitude: ×15,000) of the adsorbent that was obtained in Example 5.
Figure 7:
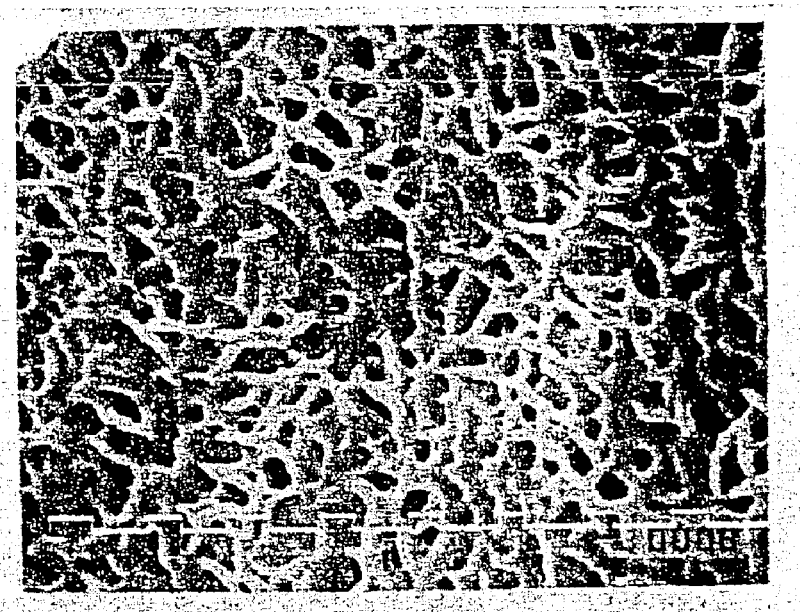
FIG. 7 is a scanning electron microscope photograph (magnitude: ×15,000) of the adsorbent that was obtained in Example 6.
Figure 8:
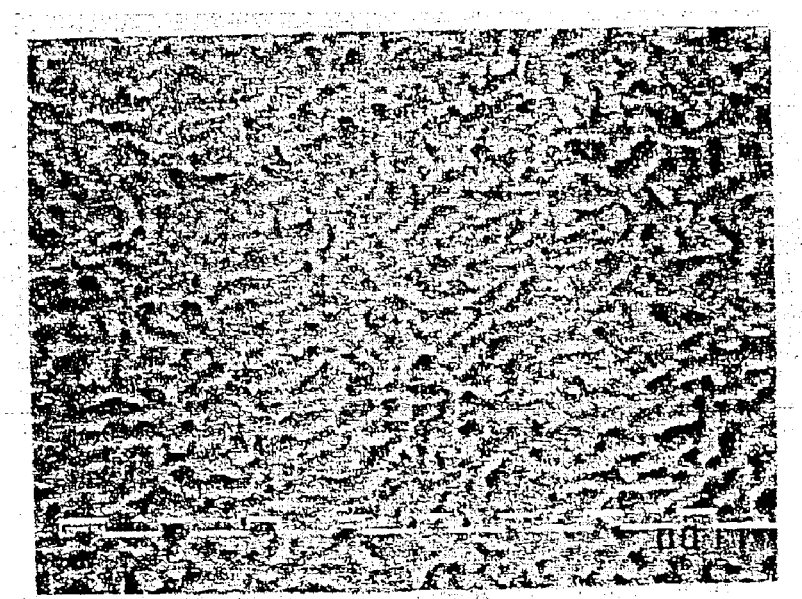
FIG. 8 is a scanning electron microscope photograph (magnitude: ×15,000) of the adsorbent that was obtained in Example 7.
Figure 9:
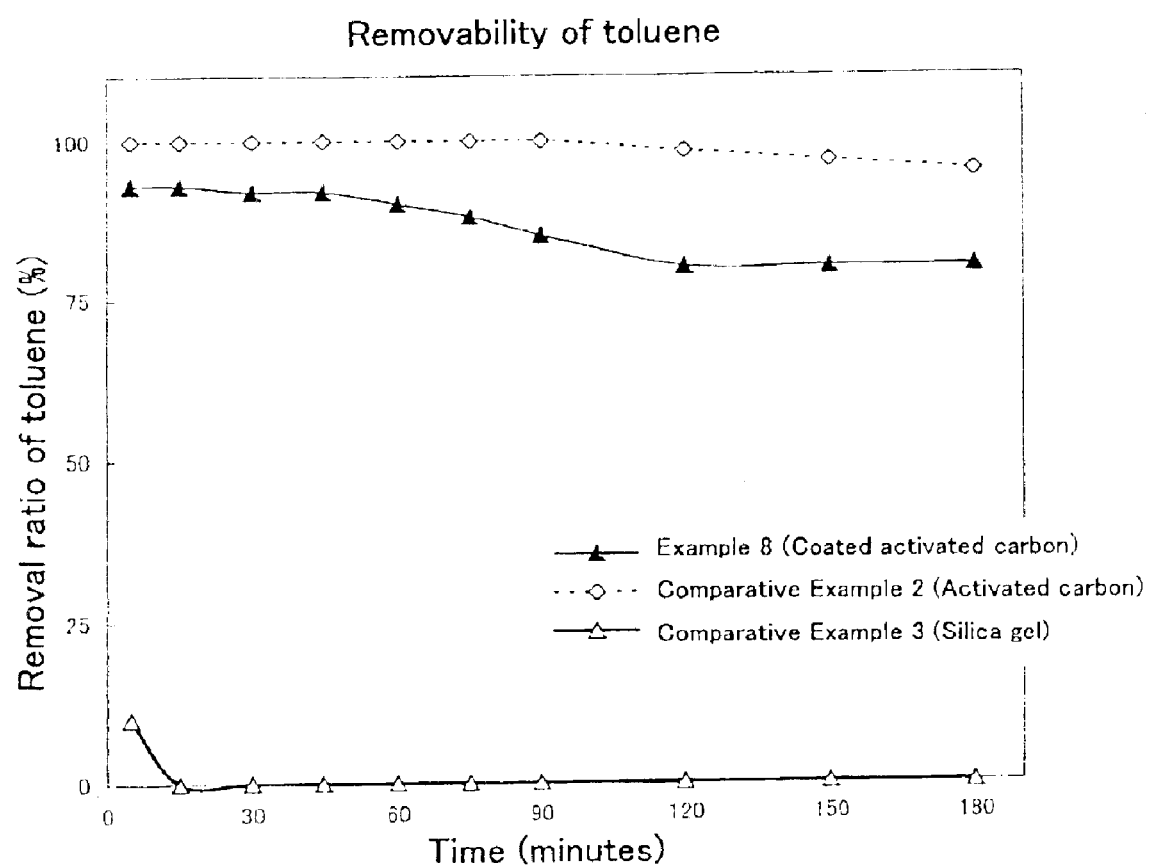
FIG. 9 is a graph showing the results of the evaluation of the gas adsorbability (removing ability for toluene) that was carried out in Example 8 and Comparative examples 2 and 3.
Figure 10:
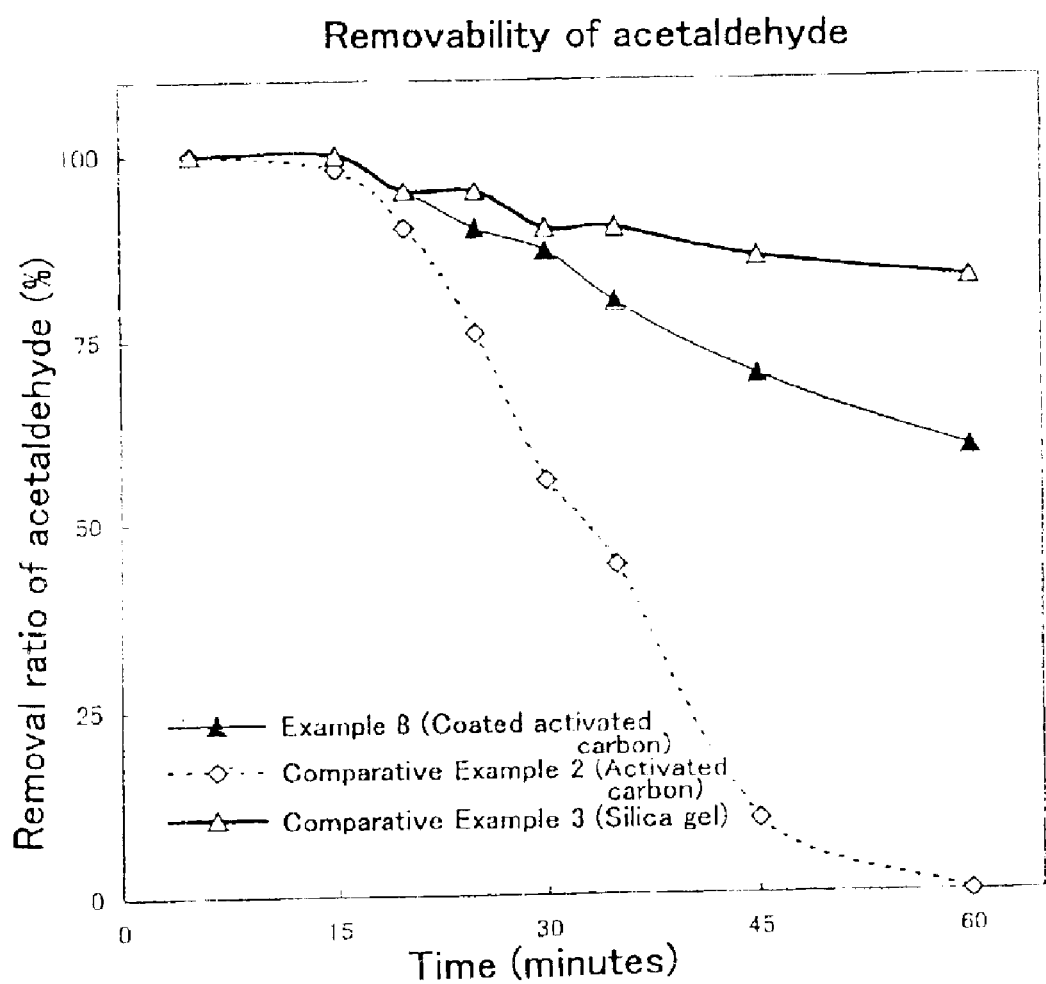
FIG. 10 is a graph showing the results of the evaluation of the gas adsorbability (removing ability for acetaldehyde) that was carried out in Example 8 and Comparative examples 2 and 3.
Figure 11:
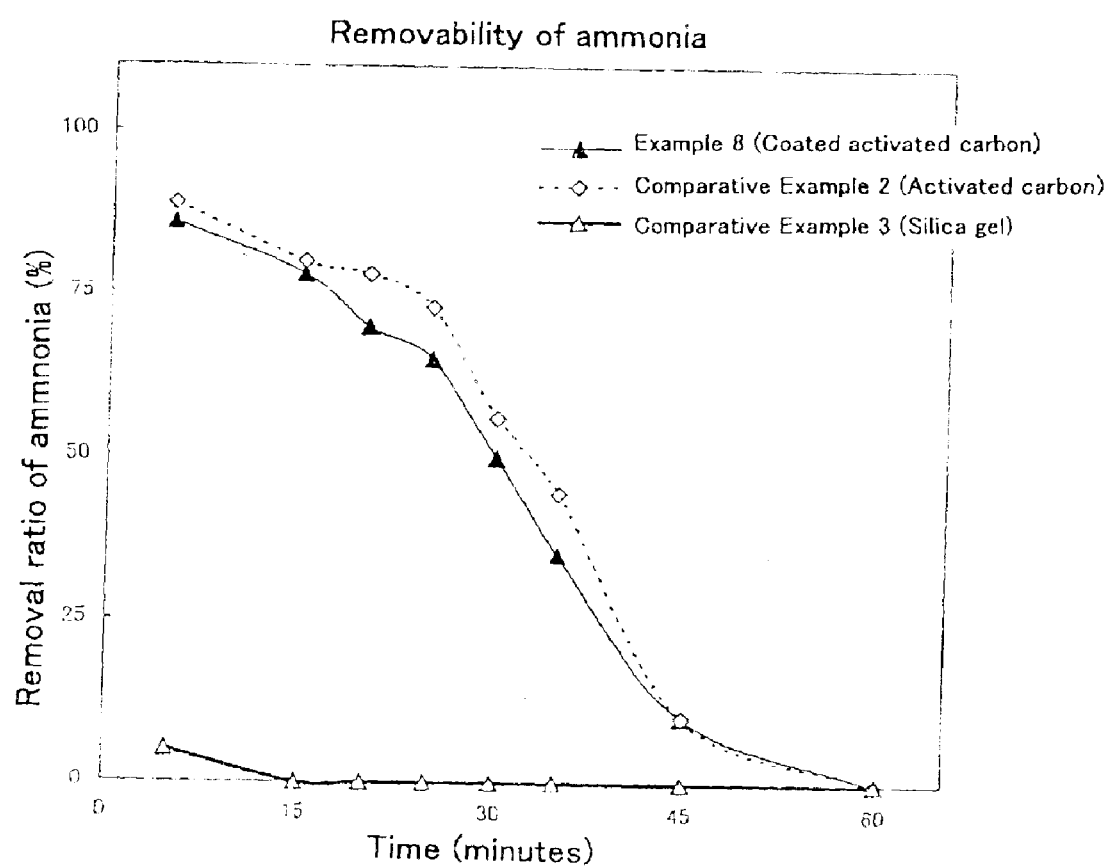
FIG. 11 is a graph showing the results of the evaluation of the gas adsorbability (removing ability for ammonia) that was carried out in Example 8 and Comparative examples 2 and 3.
Figure 12:
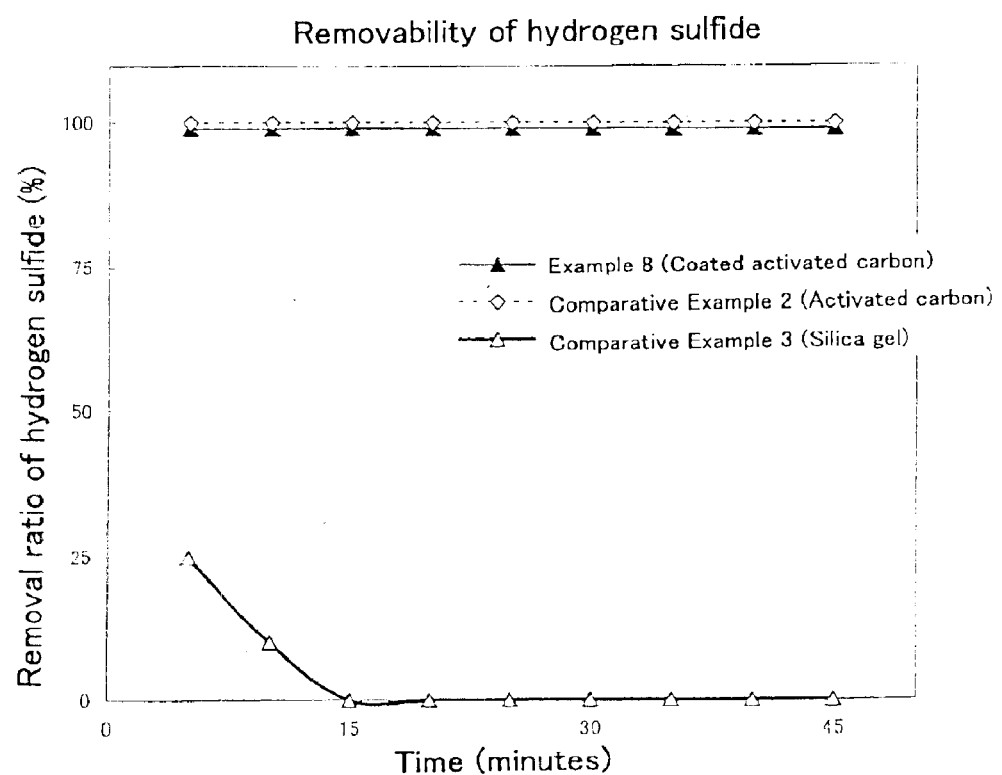
FIG. 12 is a graph showing the results of the evaluation of the gas adsorbability (removing ability for hydrogen sulfide) that was carried out in Example 8 and Comparative examples 2 and 3.

In order to investigate the influence of the thermal processing temperature after the coating process, a process of producing polytetrafluoroethylene resin fine powder coating activated carbon particles was carried out, that is similar to Example 3 except that the processing temperature for thermal processing of the polytetrafluoroethylene resin fine powder coating layer was: 325° C. (Example 5); 365° C. (Example 6); 375° C. (Example 7); or 385° C. (Comparative Example 1). In these Examples and Comparative Example, scanning electron microscope photos of the resultant activated carbon particles were taken, and photos of these Examples and Comparative Examples were compared with the photo taken in Example 3. According to the observation and comparison of the photos, it was found that: the polytetrafluoroethylene fine powder particles were mutually fused across the entire surface in Example 3 of baking at 345° C., as shown in FIG. 1; however, in Example 5 of baking at 325° C., there were portions in which the particles were not mutually fused as shown in FIG. 6 (magnitude: ×15,000); in Example 6 of baking at 365° C., it was observed that the geometries of the particles were partially deteriorated as shown in FIG. 7 (magnitude: ×15,000); in Example 7 of baking at 375° C., it was observed that the rate of hole area over the surface and the porosity of the coating layer decreased as shown in FIG. 8 (magnitude: ×15,000); and in Comparative Example 1 of baking at 385° C., it was observed that the formed layer was a non-porous uniform film having no air permeability As described above in detail, the adsorbent provided according to the present invention is free of the dust derived by the adsorbing material, and therefore the adsorbent does not contaminate gases or liquids to be cleaned. The porous polymer layer for preventing the generation of the dust from the adsorbing material is easily formed. The adsorbent has excellent adsorbability.

The adsorbent according to the present invention may include an underlying layer having particles of a metal compound, which is formed between the core particles and the porous coating layer. In this configuration, the underlying layer functions to transit the color of the adsorbing material of the core particles to a color of the metal compound. For example, when the metal compound is a white metal oxide, the resultant adsorbent may be a white-colored adsorbent.

The porous coating layer provided on the outer surface of the underlying layer captures powders or dusts generated from the adsorbing material and metal compound, and additionally prevents entering water from outside to prevent eluting the metal compound into the water out.

The metal compound may be colorless metal compound, or white colored compound such as a compound having granular configuration that irregularly reflects light to provide white color, or may be colored compound of any other color than white, e.g., yellow, blue, red and so on. Preferably, the metal compound may be at least one selected front the group consisting of oxides of metals, hydroxides of metals, carbonates of metals, sulfates of metals, phosphates of metals, meta silicates of metals, borates of metals, oxalates of metals, tungstates of metals, molybdates of metals, vanadates of metals, chromates of metals, selenates of metals and manganates of metals.

The metal compound may also be at least one compound of a metal selected from the group consisting of titanium, zirconium, silicon, zinc, iron, manganese, aluminum, magnesium, nickel, copper, silver, barium, calcium, scandium, bismuth, molybdenum, niobium, neodymium, antimony, selenium, stannum, strontium, terbium, tellurium, thorium and yttrium. More preferably, the metal compound may typically be at least one oxide of a metal selected from the group consisting of titanium, zirconium, silicon, zinc, aluminum and magnesium, and titanium oxide is the most preferable compound.

When titanium oxide is employed, an additional advantageous effect of occurring photocatalysis of titanium oxide by light transmitted through the porous coating layer can be obtainable, as well as white colored adsorbent can be obtainable. A combined advantageous effect of the photocatalysis of titanium oxide with the adsorbability of the activated carbon particles may provide better adsorbability and cleaning ability.

The underlying layer including particles of the metal compound may include a water-soluble polymer compound to prevent desorption of the particles of the metal compound.

In this configuration, ratio of the water-soluble polymer compound to the particles of metal compound is generally 0.01% wt. to 100% wt. In particular, the preferable range may be 0.1% wt. to 10% wt., since the ratio within the range may provide maintaining the adsorbability by considerably preventing crush of the micro pore of the core particles surface and desorption of the particles of the metal compound.

The water-soluble polymer may typically be at least one selected from the group consisting of polymers of: sugar, cellulose derivatives, alginic acid, methacrylic acid, acrylic acid, vinylpyrrolidone, vinyl alcohol and oxyolefin. The water-soluble polymer is not to be limited thereto, provided that the polymer can provide the functions described above.

In such case, the water-soluble polymer may be removed from the underlying layer by extracting and washing with a solvent after forming the porous coating layer.

Average particle size of the metal compound particles may preferably be 0.001 $\mu$m to 50 $\mu$m, and thickness of the underlying layer including the metal compound particles may preferably be 1 $\mu$m to 10,000 $\mu$m.

Employing the metal compound particles having smaller particle size than the above described range may cause a leakage of the particles from the porous coating layer, and employing the metal compound particles having larger particle size than the above described range may cause a difficulty in obtaining the condition of irregularly reflecting light in order to provide white color, thereby being difficult to conceal the original color of the core particles of the adsorbing material itself. Further, employing the underlying layer having smaller thickness than 1 $\mu$m may cause a difficulty in concealing the original color of the core particles of the adsorbing material itself, and employing the underlying layer having larger thickness than 10,000 $\mu$m may cause deterioration of the adsorbability.

In this type of adsorbent, the porous coating layer can prevent the immersion of water, and thus the core particles having the adsorbing material and the metal compound particles of the underlying layer can be protected from the immersed water. In other words, the particles of the metal compound do not contact with water. For the purpose of preventing the immersion of water, the material of the porous coating layer may preferably be selected so as to minimize the penetration of water, and the fluororesins having better water repellency is the most preferable choice.

The underlying layer containing the metal compound particles can be formed by a method similar to one for forming the porous coating layer.

The underlying layer containing the metal compound particles can be formed onto the core particles by spray coating a liquid (or suspension, slurry, emulsion and so on) including a water-soluble polymer and the aforementioned metal compound particles and/or other types of metal compound particles onto the core particles, or by immersing the core particles into this type of liquid, to form the coating layer on the surface of the core particles. The process for forming the coating layer may be repeated as required.

When the spray coating is carried out in this constitution, the spray coating process may preferably be carried out while the core particles are fluidized within the flow of the gas to achieve uniform spray coating. The preferable method may be, for example, that the liquid containing the metal compound particles may be sprayed to the activated carbon particles that are convected within an air blow flowing upwards in a cylindrical tube, and thereafter the drying process may be carried out in the same cylindrical tube while maintaining the convecting air flow.

Here, the nozzle employed for spraying may preferably be a dual fluid nozzle. The individual particle of metal compound particles may diffuse through the sprayed mist by employing the dual fluid nozzle, and thus the particles contained in the liquid may be deposited on the core particles surface in a coarse and fine manner without forming an agglomeration, and therefore the underlying layer can be formed without substantially breaking the surface micro pore of the adsorbing material.

In the process of forming the underlying layer, the aforementioned water-soluble polymer may be mixed to the liquid containing the metal compound particles at a ratio of, preferably, 0.01% wt. to 100% wt. to prevent the desorption of the metal compound particles.

These The water-soluble polymer generally remains within the underlying layer. However, it may be possible to remove the water-soluble polymer from the underlying layer by extracting and washing with a solvent after forming the porous coating layer.

The underlying layer containing the metal compound on the surface of the core particles is formed, and, in turn, the porous coating layer is formed on the outer surface thereof via aforementioned method.

The material for the porous coating layer is colorable, and thus the porous coating layer can be colored. For example, a red adsorbent can be obtained by forming the porous coating layer with a red colored resin that is formed by using a red material for the metal compound mixed therein. The appearance of the adsorbent can be improved by coloring the adsorbent to have a color tone that matches the surrounding background of the place where the adsorbent is located. Further, the adsorbents having different levels of adsorbability can be readily identified by providing different colors corresponding to their levels of adsorbability, and thus this provides higher value-added product.

The adsorbent is dust free, causes no concern of water leakage, and provides any desired color, and therefore the adsorbent can be utilized as they are in the particulate form without being packed with a container or a sheet. The adsorbent may be, however, supported by a base member or packed in a container.

Preferred examples of the present invention having an underlying layer formed thereon will be described below.

EXAMPLE 8

350 g of core particles of crushed activated carbon particles (30-mesh size) derived by the palm shell were introduced to a powder coating machine ("MP-01", commercially available from POWREX CORPORATION), and the activated carbon particles were convected at air feeding temperature of 60° C., air feeding flow rate of 80 $m^3$/hr., and revolution speed of a tri-blade bottom rotor of 300 rpm to create convectional movement of the activated carbon particles.

On the other hand, a suspension containing 20 parts by weight of photocatalyst titanium oxide ("ST01", average particle size: 0.2 μm, commercially available from ISHIHARA INDUSTRY Co. Ltd.), 1 part by weight of methyl cellulose 25 cp (commercially available from KANTO CHEMICAL), and 79 parts by weight of water (Japanese Pharmacopoeia, distilled water) was prepared, and 300 g of the prepared suspension was sprayed at an injection rate of 15 g/min. from a dual fluid nozzle at a condition of: a nozzle diameter of 1.2 mm; and nozzle position (orientation of spraying): along the tangential direction of the rotating bottom rotor.

The conventional movement of the activated carbon particles was continued under the same condition, and the drying process was ended when the exhaust temperature was reached to 60° C. The thickness of the coating layer including the titanium oxide was measured via scanning electron microscope photos of the cross sectional specimen that was prepared by being cut with using a cutter within liquid nitrogen, and the measured thickness was about 15 μm to about 50 μm.

Then, a suspension of polytetrafluoroethylene resin fine powder ("POLYFLON D-1", commercially available from DAIKIN INDUSTRIES Co., Ltd.) was diluted with distilled water to prepare a suspension containing solid contents of 20% wt, and 200 g of the suspension was sprayed over the convecting activated carbon particles at an injection rate of 9.5 g/min. from the above mentioned dual fluid nozzle.

The coated particles were recovered from the powder coating machine, and observed via an optical microscope or a scanning electron microscope. According to the observation, it was found that entire surface of the activated carbon particles was covered by polytetrafluoroethylene resin fine powder having a particle size of about 0.1 μm, and the thickness of the coating layer was calculated to be about 5 μm from the scanning electron microscope images of the cutting plane.

These particles were baked in the auger-built-in rotary kiln at 345° C. for about 5 minutes, and 350 g of the baked particles were processed via the aforementioned coating and baking processes again, to obtain the adsorbent of the present invention.

The resultant adsorbent was observed via optical microscopy and scanning electron microscopy, and it was confirmed that the particles of polytetrafluoroethylene resin fine powder having diameter of approximately 0.1 μm were mutually fused at the contacting point thereof to form the porous film.

On the surface image of the scanning electron microscope photograph, an image processing was carried out, in which the surface area that was not occupied by the fine powder particles was assumed to be the area of the aperture, and the aperture diameter of the surface was calculated to be 0.05 μm to 0.1 μm based on the assumption and the image processing described above. Further, it was confirmed that value of the calculated aperture diameter of the cutting cross sectional plane was approximately identical to the value of the calculated aperture diameter of the surface according to the image processing for the image of the cutting cross sectional plane. This provides that the entire surface of the activated carbon particles was substantially uniformly covered with polytetrafluoroethylene resin fine powder. The thickness of the coating layer was also calculated to be about 10 μm to 20 μm from the scanning electron microscope photograph image of the cutting cross sectional plane. Further, the porosity measured via the aforementioned porosity measurement method was 50%.

The adsorbability of the adsorbent was evaluated by the following method.

An adsorbing column was prepared by filling a clean glass tube having a diameter of 14 mm (and length of 150 mm) with 1 g of the above-mentioned adsorbent.

A mixed gas containing 100 ppm of toluene, 50 ppm of acetaldehyde, 30 ppm of ammonia or 10 ppm of hydrogen sulfide and a carrier gas of air was flowed through the column at a volumetric flow rate of 1 L/min., and the gas concentrations of the original gas (at the inlet) and the adsorbed gas (at the outlet) were monitored by using. gas detection tube "92M", "3L", "121L" and "4LL" all of which were commercially available from GASTECH CORPORATION, and the gas removal ratio was calculated via the following equation to present the gas adsorbability. The results are shown in FIGS. 9–12.

Gas removal ratio (%)=(concentration of the original gas to concentration of the adsorbed gas)/(concentration of the original gas)×100

COMPARATIVE EXAMPLE 2

The column was filled with the activated carbon particles, that were used for the core particles instead of the adsorbent used in Example 8, and the adsorbability thereof was evaluated by a similar method as in Example 8. The results are shown in FIGS. 9–12.

COMPARATIVE EXAMPLE 3

The column was filled with white-colored adsorbent of amino group-supported silica gel instead of the adsorbent used in Example 8, and the adsorbability thereof was evaluated by a similar method as in Example 8. The results are shown in FIGS. 9–12.

The following issues were found in FIGS. 9–12. The white-colored adsorbent of amino group-supported silica gel of Comparative Example 3 has no adsorbability for gases except aldehydes. This is because the amino group-supported silica gel of Comparative Example 3 involves the adsorbability for aldehydes via an adsorbing mechanism of electrophilic substitution reaction of carbon of carbonyl group of aldehyde with amino group of the surface of silica gel, and the adsorbability does not involve the adsorption via the intermolecular force or hydrophobic bond that would be provided to the activated carbon of Comparative Example 2. On the other hand, the adsorbent of Example 8 according to the present invention provides the adsorbability that is substantially equivalent to the adsorbability of the activated carbon of the Comparative Example 2 and is applicable to variety of materials, since the adsorbent of Example 8 according to the present invention includes activated carbon for the core particles. Further, the adsorbent according to the present invention is white-colored that involves better appearance, and does not cause an emission of contamination dust.

As described above in detail, the present invention provides the adsorbents that can adsorb wide variety of compounds as well as polar compounds, also provides colors other than black, in particular white color. The adsorbent according to the present invention does not require packaging. Thus, the adsorbent applicable to variety of cleaning systems can be presented.

The adsorbent according to the present invention may be utilized for an indoor ambient air cleaning member that adsorbs and removes toxic gases in the indoor ambience.

The details of the application for the indoor ambient air cleaning members will be described as follows.

The indoor ambient air cleaning member according to the present invention comprises core particles having an adsorbing material for toxic gases, and a porous coating layer comprising a polymer material that coats the core particles.

The core particles may be activated carbon, silica gel, alumina gel, zeolite or diatomearth. The core particles may also be an anion exchange resin, a cation exchange resin, and a chemical deodorizer such as $TiO_2$, $SiO_2$, $ZrO_2$, ZnO and so on. A material having an affinity to toxic gases may be supported to the adsorbing material.

Particle size of the core particles and film thickness, pore size and the forming method of the porous coating layer are as described above.

Also, the porous coating layer may be colored to a desirable color. Accordingly, the indoor ambient air cleaning members can be used as an exposed manner without any package, and in such case, the adsorbent can be colored to a suitable color for the background of the indoor aspect, thereby improving the aesthetic value thereof.

The following are examples of the indoor ambient air cleaning members.

EXAMPLE 9

A water suspension including 10% wt. of polystyrene resin beads having a particle size of 0.1 µm was prepared via an ordinary emulsion polymerization and an ordinary purification. Then, a cumulative 200 g of the above mentioned suspension was sprayed to 300 g of core particles of crushed activated carbon (produced from the palm shell, particle size of between 30-mesh and 20-mesh) by using a powder coating machine of an air blowing convection type, and consequently a drying process was carried out therein. It was observed via a scanning electron microscope photo of ×15,000 of the dried product that the coarse and fine coating layer of polystyrene resin particles having particle size of 0.1 µm was formed on the surface of the activated carbon particles.

The resultant particles were thermally processed at 150° C. in the powder dryer so that the polystyrene resin particles on the coating layer can be mutually fused only at the contacting point thereof to convert the coating particles to a porous film, thereby obtaining the indoor ambient cleaning material. The indoor ambient air cleaning member was deep blue, and had no surface gloss, and the porous resin coating layer that was only 7 wt. % of the activated carbon particles was formed.

The gas adsorbability of the indoor ambient air cleaning member was measured by using the gas detection tube of #70 (for all types of mercaptan), #81 (for lower carboxylic acid) and #180 (for amines), all of which are commercially available from GASTECH CORPORATION. The results indicated that the adsorbability of the indoor ambient air cleaning member was equivalent to 70 to 90% of that of the pre-coated activated carbon, depending on the types of gases. Also, the indoor ambient air cleaning member was affixed at one position on the inner wall of the clean glass tube of 20 φ, and the ultra pure nitrogen gas was flowed through the tube at a volumetric flow rate of 2 L/min. The detection of the fine dust was conducted for the exhaust gas by using a laser scattering type particle measuring machine. However, no carbon particle having particle size of not smaller than 0.3 µm was detected. Therefore, it was confirmed that no dust was emitted from the adsorbing material itself.

A mixed dispersion liquid was prepared by mixing 30 parts by weight of the indoor ambient air cleaning member, 15 parts by weight of a binder ("AE932", commercially available from JSR Co. Ltd.) and 5 parts by weight of a surfactant ("PEG1000", commercially available from KANTOH CHEMICAL Co. Ltd.) and 50 parts by weight of water.

The prepared mixed dispersion liquid was readily applied onto a wall by using a sponge roller, and thereafter the coated wall was dried at 120° C. by using a hot air blower, and further the indoor ambient cleaning material was fixed onto the wall surface to obtain an indoor ambient cleaning material clay wall. The surface of the obtained wall was rough touching, and a part of the deep blue colored indoor ambient cleaning material, that looked like soil particles, flaked off the wall when the wall was strongly polished. Therefore, a product having similar appearance and characteristics to the clay wall was obtained. On the contrary, generation of any fine particles such as carbon dust was not confirmed.

Consequently, the adsorbability of the indoor ambient cleaning material wall for the indoor ambient was evaluated. In this evaluation, the ambient for evaluation was a closed space having a bottom surface of 10 m² and height of 2,100 mm, enclosed by four smooth plywood boards for four side walls, and two smooth polypropylene resin boards for the bottom and the ceiling. Gas emission from the resin boards was collected by using a gas collector, and the collected gas was evaluated by a GC-MS. It was confirmed that no aldehydes, DOP, lower carboxylic acids (having 1 to 10 carbons), or ammoniacal nitrogen compounds was detected.

In this space, one BALB mouse (male, 6 week-aged), commercially available from CHARLES RIVER LABORATORIES JAPAN Co. was bred within a commercially available cage having a bottom area of 300 mm×300 mm that was disposed within the space. The bottom of the cage was a grating, and a smooth polypropylene tray was disposed under the grating bottom, and no other object was installed over the bottom of the cage except a tray for containing a feeding stuff and a piping for feeding water. The feeding stuff was "CR-LPF", commercially available from ORIENTAL YEAST Co. Ltd. 30 g of the feeding stuff was fed twice a day, and all of uneaten feeding stuff was removed at the next feeding. Water was suitably fed to the mouse, which was a commercially available mineral water ("Minami Alps Ten-nen sui", commercially available from SUNTORY Co. Ltd). Air ventilation was performed once an hour, in which a side wall was removed and the side was released for 1 minute. Lighting cycle was programmed so that light was on for 12 hours and off for next 12 hours and the lightning cycles were repeated.

In the initial 3 days front commencing the experiment, excremental matter was not removed or cleaned. Concentration of sulfur-containing organic compounds such as mercaptan, concentration of carboxylic acids such as isovaleric acid and concentration of nitrogen compounds such as ammonia were monitored for 3 days from commencing the experiment at a height of 1.5 m. The measurements were conducted at every 6 hours by using the gas detection tube of #70 (for all types of mercaptan), #81 (for lower carboxylic acid) and #180 (for amines), all of which were commercially available from GASTECH CORPORATION.

The experiments were conducted for 5 mice to obtain an average result of these experiments. The average result was compared with a result of control experiments, details of which will be described below.

Figure 13:
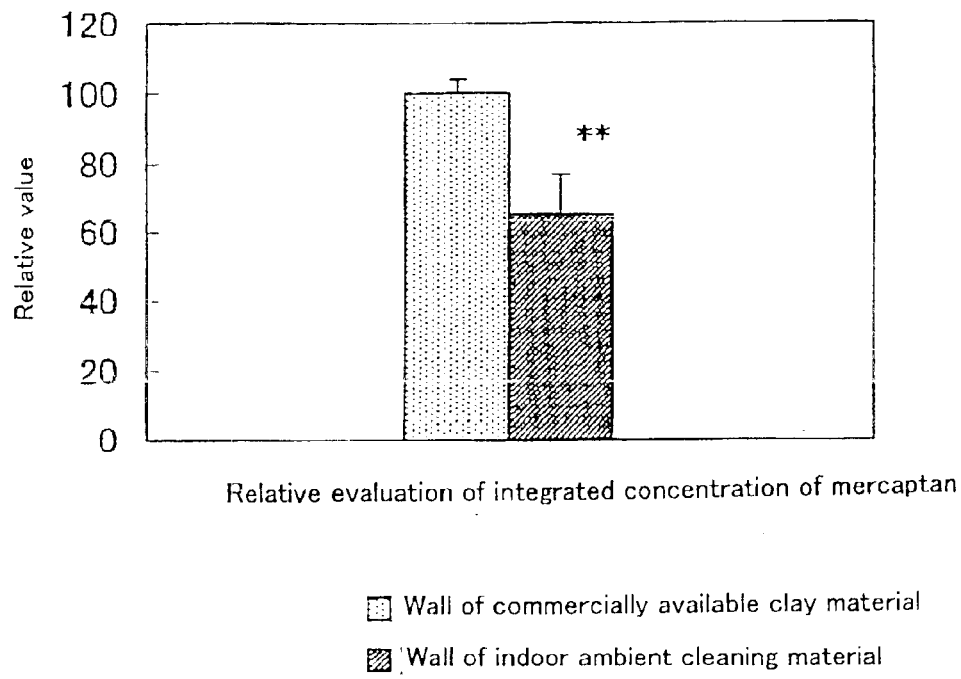
FIG. 13 is a bar chart showing the removing ability for mercaptan of a clay wall on which the indoor ambient air-cleaning member is fixed according to Example 9 and a clay wall that is commercially available.
Figure 14:
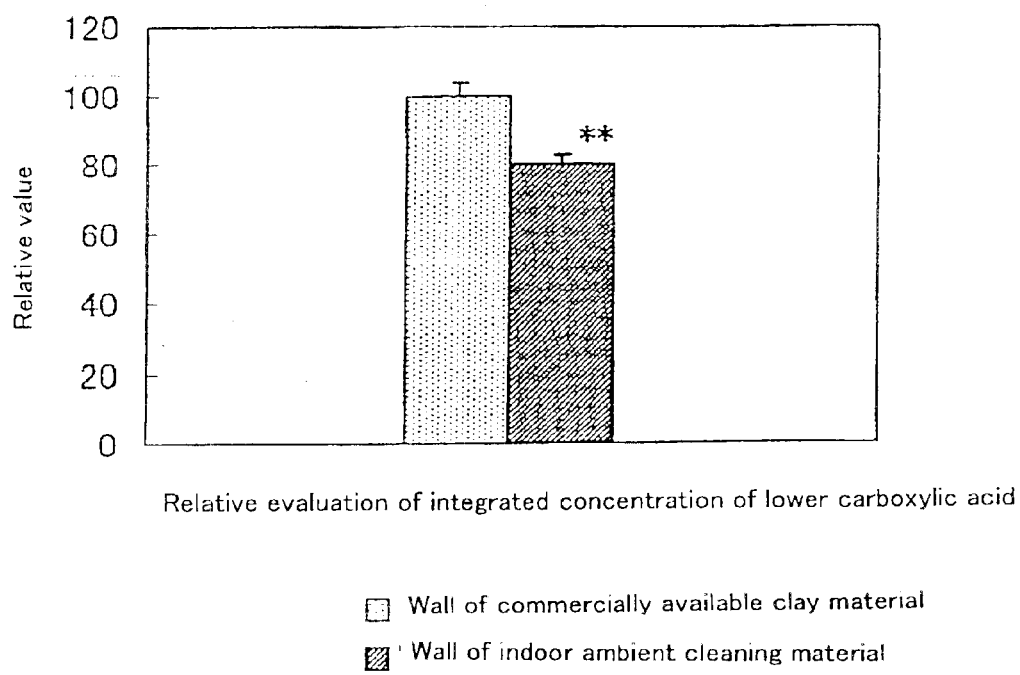
FIG. 14 is a bar chart showing the removing ability for lower carboxylic acids of a clay wall on which the indoor ambient air-cleaning member is fixed according to Example 9 and a clay wall that is commercially available.
Figure 15:
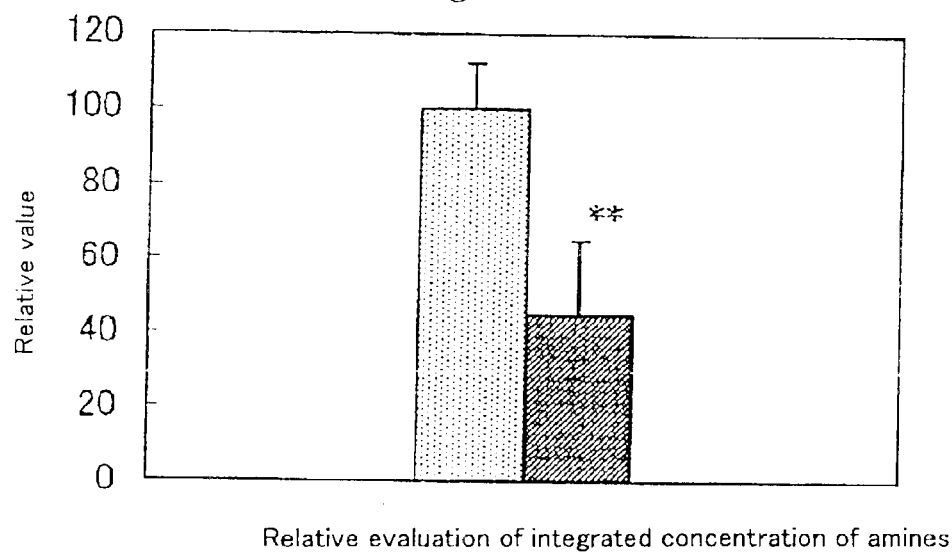
FIG. 15 is a bar chart showing the removing ability for amines of a clay wall on which the indoor ambient air-cleaning member is fixed according to Example 9 and a clay wall that is commercially available.

The control experiments were conducted under the same conditions except that the four side walls were applied with a commercially available clay material. The results are shown in FIGS. 13 to 15. The significant tests were conducted on each of the gas measurements between the wall of the indoor ambient cleaning material and the wall of the commercially available clay, and the results showed that a significant difference was confirmed at the percentage of risk of 3%. In these figures, two stars above the bar indicates the risk percentage of 3%, and one star indicates the risk percentage of 5%.

EXAMPLE 10

A drying process arid a thermal processing similar to Example 1 were carried out except that a water suspension including 10% wt. of polystyrene resin beads having a particle size of 0.2 μm was sprayed onto the core particles of activated carbon (produced from the palm shell, particle size of between 20-mesh and 10-mesh) to obtain an indoor ambient cleaning material. Red, blue and yellow colored polystyrene beads were used to present three types of lusterless indoor ambient cleaning materials of red purple, deep blue and ocher colored, respectively.

Each of the indoor ambient cleaning materials contained the porous resin coating films of about 15% of the weight of the activated carbon. The results indicated that the adsorbability of the indoor ambient air cleaning members were equivalent to 50 to 80% of that of the pre-coated activated carbon, depending on the types of gases, and no generation of carbon particles having particle size of not smaller than 0.3 μm was detected.

These three colored indoor ambient air cleaning members, as well as the indoor ambient air cleaning members of Example 9, were fixed onto the adhesive tape (using EVA type adhesives) of 300 mm×300 mm and four paintings of flowers, mountains, starry sky and abstract painting of a person were painted thereon to present indoor ambient air cleaning paintings.

Figure 16:
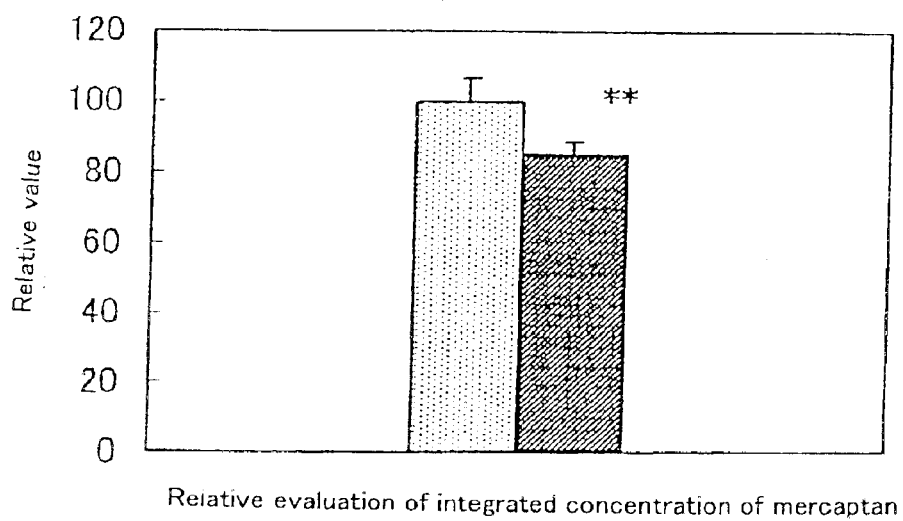
FIG. 16 is a bar chart that provides a comparison between the mercaptan removing ability of a clay wall having a brushwork painting prepared by using the indoor ambient air cleaning member of Examples 9 and 10 thereon arid a clay wall that is commercially available.
Figure 17:
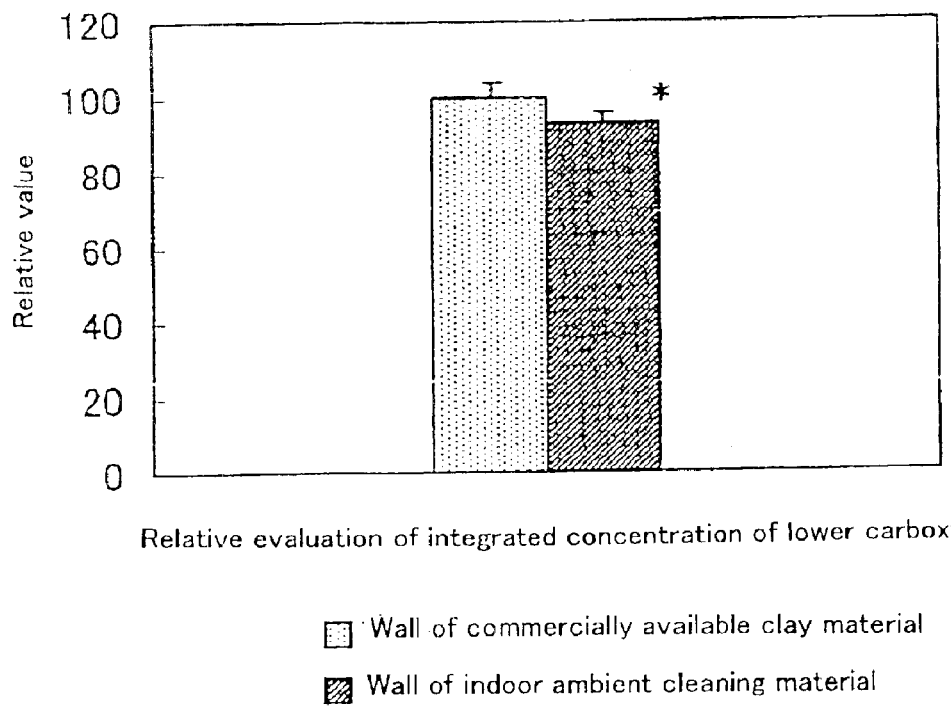
FIG. 17 is a bar chart that provides a comparison between the ability for removing lower carboxylic acids of a clay wall having a brushwork painting prepared by using the indoor ambient air cleaning member of Examples 9 and 10 thereon and a clay wall that is commercially available.
Figure 18:
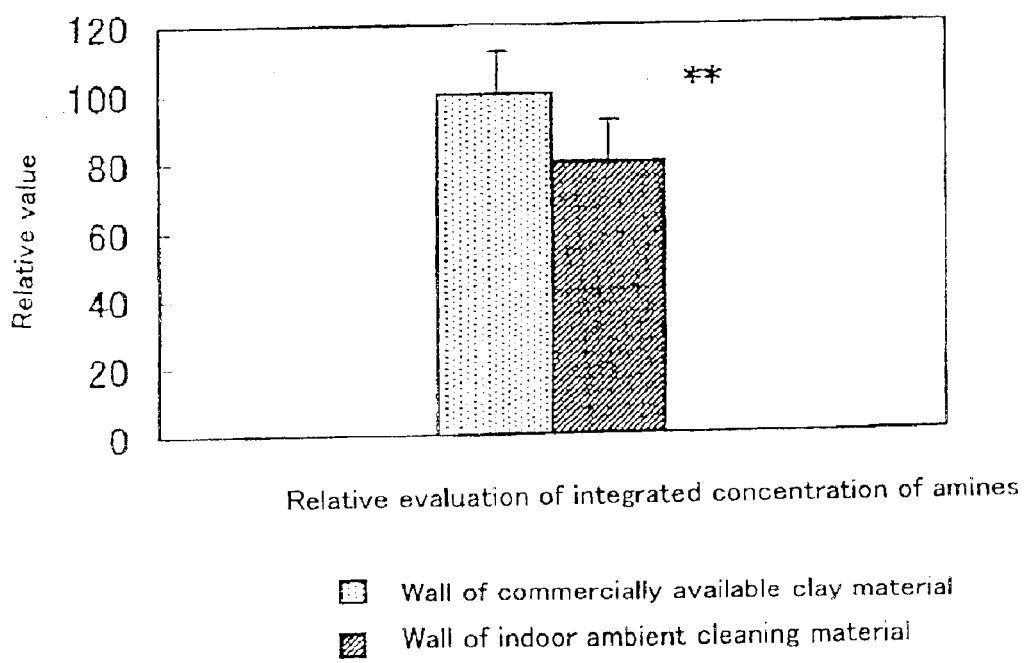
FIG. 18 is a bar chart that provides a comparison between the ability for removing amines of a clay wall having a brushwork painting prepared by using the indoor ambient air cleaning member of Examples 9 and 10 thereon and a clay wall that is commercially available.

Then, an experiment was carried out by the method similar to that of Example 9, except that the surfaces of the four side walls were commercially available wall papers and not clay, and that the above described four indoor ambient air cleaning paintings were installed at a height of 1,500 mm on the four side walls, respectively. The results are shown in FIGS. 16 to 18, and the results showed that a significant difference in the toxic emission concentration for the system of having the indoor ambient air cleaning paintings over the system of the commercially available wall paper was confirmed at the percentage of risk of 3%.

As described above, because the indoor ambient air cleaning members according to the present invention are the particles of the adsorbing material itself coated with the polymer porous film, the indoor ambient air cleaning members according to the present invention can prevent the generation of the dusts from the adsorbing materials itself, and the adsorbability which the adsorbing material originally has can be fully exhibited, thereby the toxic gases within the indoor ambience can be fully removed.

The adsorbent according to the present invention can be applicable to an air cleaning method and an air cleaning machine, which are preferably applicable to an air cleaning filter for introducing outdoor air to car room, a gas removing filter for a trace amount of gases for a clean room, a smoke neutralizer for home use or office use, or an air cleaning filter for air conditioner.

In this method and machine, the adsorbent may be contained in the air flowing tube in a manner of freely fluidizing within the tube by the air flow, without being fixed in the tube, and contaminated air to be cleaned is blown or drawn into the air flow tube. Since the particulate adsorbent is not fixed to two-dimensional or three-dimensional structure, the volume thereof may not be larger than necessary, and thus costly large structure is avoided. Also, the adsorbent may not cause a problem of decreasing the adsorbability due to the use of adhesives for fixing the adsorbent, or not cause a problem of dropping out the adsorbent from the fixed structure. Further, since the adsorbent particles can be freely fluidized, the channel for air flow is broader and the pressure drop is small.

The structure of the air flow tube may be cylindrical, conical, polygonal pole, polygonal pyramid or so on, and not limited to a specific structure, provided that the scattering of the freely fluidizing particulate adsorbent is avoided and the scattered particles can be recovered. Further, the quantity of the particulate adsorbent is determined depending on the specific gravity of the adsorbent, air flow rate, and the structure of the tube, and not particularly limited as long as the particulate adsorbent can be freely fluidized.

The air flow tube is preferably tilted at an angle at which the entire of or a part of the particulate adsorbent freely falls by its own weight. This indicates a condition in which a clearance may be readily created among the particulate adsorbent particles within the air flow tube when the air to be cleaned is blown or drawn into the air flow tube from lower side toward the upper side. Therefore, the preferable angle may be determined depending on the adhesion or roughness of the surface of the particulate adsorbent particles, friction coefficient of the inner wall of the air flow tube, quantity and specific gravity of the particulate adsorbent, air flow rate, cross sectional area of the air flow tube and so on. Also, the air flow tube itself may vibrate, swing or stroke of a pendulum, and these movements may promote the free fluidization of the particulate adsorbent.

The adsorbing material composing the core particles may preferably be the aforementioned materials. That is, the materials such as activated carbon, silica gel, alumina gel, zeolite or diatomearth, or mixtures thereof, an anion exchange resin or a cation exchange resin, and a chemical deodorizer such as $TiO_2$, $SiO_2$, $ZrO_2$, $ZnO$ and so on. The core particles may be composed of two or more adsorbing materials. For example, the core particles composed of activated carbon and silica gel may be capable of stably adsorbing and removing the moisture (water) for longer term by the silica gel, capable of rapidly adsorbing the moisture (water) with better response and adsorbing the organic compound gas by the activated carbon. Further, the core particles can support a chemical compound to improve the adsorbability to a specific material. For example, an aromatic amine compound is supported on the core particles to improve the adsorbability to the aldehydes, and a base compound such as potassium hydroxide is supported on the core particles to improve the adsorbability to the acidic gas such as hydrogen sulfide. In this case, a chemical deodorizer, which decomposes the odor compounds, can also be supported on the core particles.

When two or more adsorbing materials are used to prepare the core particles, these adsorbing materials may be mixed and thereafter a tableting process for the mixed materials may be carried out to provide core particles having uniform specific gravity and particle size.

Particulate adsorbent having particles of uniform specific gravity and uniform particle size may be disposed within the air flow tube in the present invention.

Alternately, particulate adsorbent having particles of different specific gravities and different particle sizes may be disposed within the air flow tube and are freely convected within the air flow tube. In such case, particulate adsorbent particles having higher specific gravity are segregated to settle down to lower portion of the air flow tube, so that a gas to be adsorbed is introduced from the bottom of the tube and thus may be first adsorbed with the adsorbent having higher specific gravity, and then adsorbed with the adsorbent having lower specific gravity. For example, when first basic material-supported adsorbent particles having relatively higher specific gravity and larger particle size and second acidic material-supported adsorbent particles having relatively lower specific gravity and smaller particle size may be mixed within the air flow tube and the mixed particulate adsorbents are freely convected, much of the first adsorbent particles are segregated to lower portion of the air flow tube, and much of the second adsorbent particles are also segregated to upper portion of the tube.

In order to adsorb the gas components of higher concentration by the larger sized adsorbent particles and to adsorb the gas components of lower concentration by the smaller sized adsorbent particles, adsorbent particles of relatively larger particle size having higher adsorbing rate and adsorbent particles of relatively smaller particle size having lower adsorbing rate may be disposed within a single air flowing tube and freely convected within the tube.

In this case, the manner of the movements of the adsorbent particles can be that the particulate adsorbent particles only vibrate within the air flow tube, and in such case, better adsorbability may be instantaneously obtainable only when the air to be adsorbed passes the instantaneously created clearances between the particulate adsorbent particles that are instantaneously created by the vibration. Here, we include this type of movements into the "free" movement.

Size of the particles, structure of the porous coating layer, and the manufacturing method of the porous coating layer will be described below.

The air cleaning machine according to the method of the present invention comprises a particulate adsorbent, an air flow tube that is filled with the particulate adsorbent without fixing in a manner in which the particulate adsorbent particles can be freely moved by air flow, and a device for blowing and drawing air to be cleaned into the air flow tube. Here, the blowing device and the drawing device may be selected from the ordinary blowing devices and ordinary drawing devices such as, for example, blade-rotating type, plunger type and turbo type.

Preferred embodiments of the air cleaning methods and devices according to the present invention will be described below.

EXAMPLE 11

First, for the purpose of preparing the particulate adsorbent, a water suspension including 10% wt. of polystyrene resin beads having a particle size of about 0.1 $\mu$m was prepared via an ordinary emulsion polymerization and an ordinary purification, and then, the suspension was sprayed to core particles of crushed activated carbon produced from the palm shell and of 30-mesh size, and the coated particles were dried and thermally processed to obtain the particulate adsorbent. The particulate adsorbent was deep colored and had no surface gloss, and the porous resin coating layer that was only 7% of the amount of the activated carbon particles was formed.

The results indicated that the adsorbability of the particulate adsorbent was equivalent to 70 to 90% of that of the pre-coated activated carbon, depending on the types of gases. Further, 700 grains of the particulate adsorbent were exposed to the gas flow of ultra pure nitrogen (flow rate: 1 L/min.) within a clean circular cylindrical vessel of 14 $\phi$, and the number of particles within the recovered nitrogen gas was counted by the PM counter ("KC-10 C", commercially available from LION CORPORATION), and the result shows that any contamination carbon dust having diameter of not smaller than 0.3 μm was not found.

Then, 1.0 g of the resultant particulate adsorbent was introduced to a glass cylinder tube vertically placed and having 14 φ and length of 150 mm, and the bottom and the top of the cylinder were covered with screen meshes of polyester having openings of 50 mesh. Air was introduced to the cylinder from its bottom part at a flow rate of 13.9 liter per minute by using a turbo air blower, and it was observed that the particulate adsorbent was convected, and that the pressure drop after reaching the steady state of the convection was 55 Pascals.

Then, highly pressurized acetaldehyde gas mixture (concentration of acetaldehyde was 254 ppm and carrier gas was nitrogen) was mixed to the air by the turbo blower, and the mixed gas or air containing 3 ppm of acetaldehyde was introduced into the cylinder together at a flow rate of 13.9 liter per minute (equivalent to the linear flow speed of 1.5 m per minute).

Figure 19:
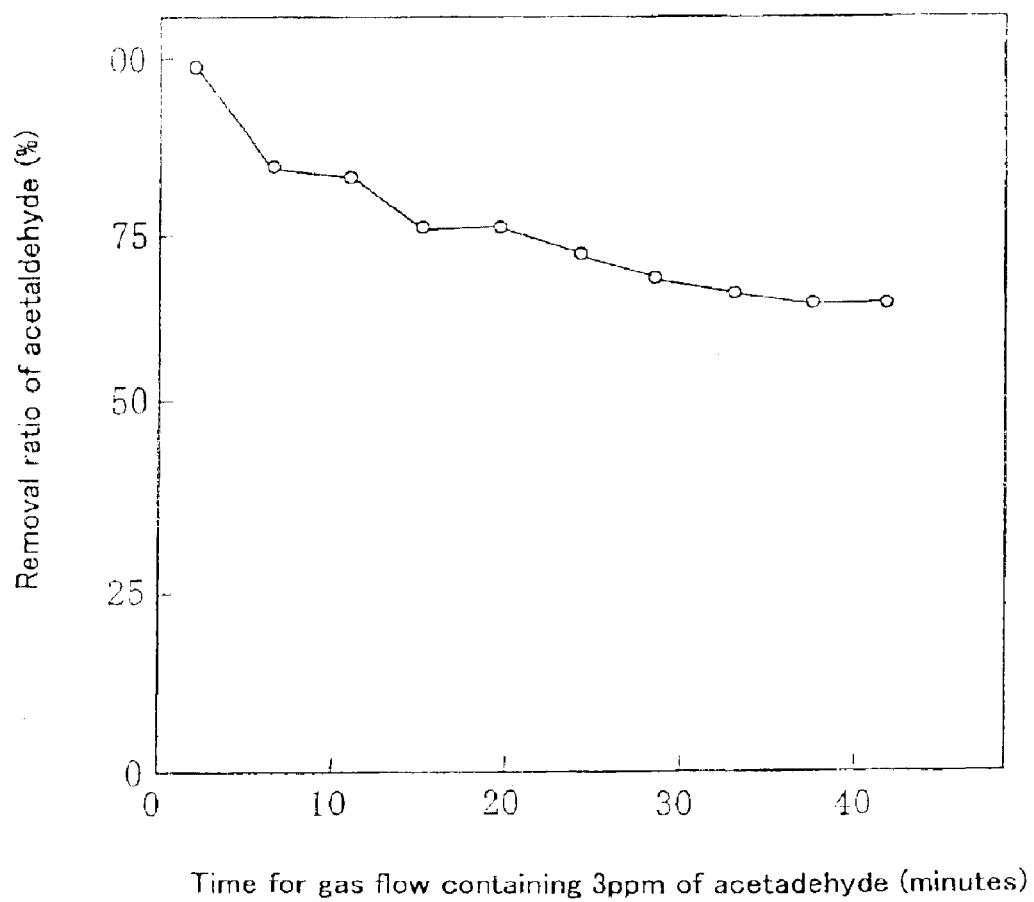
FIG. 19 is a graph showing the ratio of removing acetaldehyde according to the method for cleaning air of the present invention.

Recovered gas was partially transported to FID-GC (commercially available from GL SCIENCE Co. Ltd.) by using a gas introducing device (commercially available from GL SCIENCE Co. Ltd.), and the concentration of acetaldehyde was measured by time. The results of the measurements were shown in FIG. 19, where it was indicated that the stable adsorbing was accomplished.

COMPARATIVE EXAMPLE 4

The crushed activated carbon particles of 20-mesh size produced from the palm shell were transferred onto the sieve of 30-mesh opening size, and the particles were washed with an injection solvent water of the Japanese Pharmacopoeia, and then the particles were dried by being left at 110° C. 700 grains of these particles were also used to clean the nitrogen gas as in Example 11, and the results of the evaluation showed that 77,451+/−1,959 particles (per 0.1 QF) having diameter of 0.3 μm to 0.5 μm were found within the recovered gas.

Then, the activated carbon particles were fixed to a foam polyurethane of 7 mm thick and 10 PPI cell size by using acrylic resin binder to form a filter. The amount of the fixed activated carbon particles was about 600 g per 1 $m^2$ of the filter, and thus, when the filter was formed to a circle filter of 14 φ, 10 ply-layered filter (about 80 mm thick in total) was necessary for obtaining equivalent amount of the adsorbent as in Example 11, i.e., 1 g.

Also, when the layered filter was disposed within the acetaldehyde cleaning conditions of Example 11, the pressure drop was equal to or higher than 1,000 Pascals, which is significantly larger than that of Example 11, i.e., 55 Pascals.

Conversely, the circular filters were incorporated within the circular tube and the pressure drop of the tube was adjusted to 55 Pascals. However, the adsorbability of the tube for acetaldehyde was not presented.

As described above, the air cleaning methods and machines of the present invention provide lower pressure drop and better adsorbability and air cleaning ability, and, in addition, provide no dust emission that otherwise leads to dust explosion and/or dust contamination.

The adsorbent according to the present invention can be applicable to dehumidifying materials for inner gas of dual-glass window.

The dehumidifying materials for inner gas of the dual-glass window according to the present invention may include core particles containing an adsorbing material and a porous coating layer of a polymer material, with which the core particles are coated. The adsorbent is dust free. Therefore, it is not necessary to dispose the adsorbing material to an unwoven cloth as in the conventional manner, and thus the adsorbing material can be directly fixed onto the inner space between the glasses of the dual-glass window.

Here, the adsorbing material may be selected from any of the aforementioned adsorbing materials.

Also, a single adsorbing material or mixed adsorbing materials may be used. The selection of the adsorbing material or the mixing ratio of the adsorbing materials may be selected depending on the humidity of the dry air encapsulated between two glasses, seal ability of the glasses, ambient humidity of the manufacturing locations and so on. The details of the core particles and the porous coating layer are as described above.

The preferred embodiments of the dehumidifying materials for the inner gas of the dual-glass window will be described as follows.

EXAMPLE 12

First, for the purpose of preparing the dehumidifying material according to the present invention, about 300 g of silica gel particles having a particle size of 0.55 mm were prepared, and about 100 g of a water suspension containing 20% wt. of polytetrafluoroethylene resin beads having a particle size of 0.1 μm was sprayed to the silica gel particles in a coarse and fine state, and thereafter the silica gel particles were dried. In this stage, observations of the particles were carried out by using a scanning electron microscope. The observation provided that the polytetrafluoroethylene resin beads were deposited and covered over the entire surface of the silica gel particles, and the thickness of the coating layer was about 5 μm.

Thereafter, the particles were baked by using a rotary kiln for 3 minutes at about 350° C., and after cooling the particles the process from the coating process by spraying to the baking process by using the rotary kiln was repeated for two times in total to obtain the dehumidifying material for the inner gas of the dual-glass window according to the present invention. The obtained dehumidifying material was silica gel particles, on the surface of which polytetrafluoroethylene resin coating layer of about 10 μm thick was formed. The polytetrafluoroethylene resin beads itself were mutually fused only at the contacting point thereof, thereby providing the porous layer having a size of the opening equivalent to about 0.2 μm.

Next, 700 grains of the obtained dehumidifying material were exposed to the gas flow of ultra pure nitrogen (flow rate: 1 L/min.) within a clean circular cylindrical vessel of 14 φ, and the number of particles within the recovered nitrogen gas was counted by the PM counter ("KC-10C", commercially available from LION CORPORATION), and the result shows that any contamination dust having diameter of not smaller than 0.3 μm was not found. Thus, it was confirmed that the adsorbent itself did not cause a problem of creating contamination dust.

Consequently, the dehumidifying ability was evaluated as follows. First, a saturated solution of inorganic compounds listed in TABLE-1 was poured into a tray having a dimension of 200 mm×200 mm (height: 20 mm) to a level of 80% of the height of the tray, and the tray was then transferred to a desiccator having a built-in hygrometer (width 300 mm×length 500 mm×height 500 mm), and the desiccator was transferred to a thermostat and left for 3 hours as it was. Here, three temperatures of the thermostat were selected as shown in TABLE-1. Also, the humidity within the desiccator was shown in TABLE-1.

TABLE 1

| salts in the saturated solution | temperature | relative humidity (%) |
|---|---|---|
| $ZnSO_4.7H_2O$ | 5 | 95 |
| $Na_2SO_4.10H_2O$ | 20 | 93 |
| $NH_4H_2PO_4$ | 30 | 93 |

Then, 100 g of silica gel particles that were not coated by the porous coating layer and 100 g of dehumidifying material according to the present invention were fed to the trays having a dimension of 200 mm×200 mm (height: 20 mm), and the trays were then transferred to a desiccator where the humidity change was measured. The results of the measurements show that both of the uncoated silica gel and the dehumidifying material of the present invention exhibit substantially same behavior, and thus it is found that the dehumidifying material according to the present invention retains the dehumidifying characteristic which the silica gel originally has.

Next, a window sash (size: 900 mm×1,800 mm) of a dual-glass window comprising two transparent glass sheets of 3 mm thick and containing an air layer of 6 mm thick between the two glass sheets was prepared. 20 g of the dehumidifying material according to the present invention was disposed in a space for positioning the conventional dehumidifying material within the window frame of aluminum alloy.

The dual-glass window was stored in a laboratory, in which the room temperature was set to 25° C. for 1 hour, and thereafter the dual-glass window was transferred into a refrigerator of 4° C., where no condensation or no haze was observed. In addition, no foreign object such as fine dust was observed within the glasses.

As described above, dehumidifying materials for inner gas of dual-glass window according to the present invention include the particles of the adsorbing material coated with the polymer porous layer. Thus, the dehumidifying material according to the present invention can prevent the generation of the dusts from the adsorbing materials itself, and the adsorbability which the adsorbing material originally has can be fully exhibited without scattering the dusts within the space between the glasses of the dual-glass window, thereby the antinomy of providing better dehumidifying effect and miniaturizing the volume can concurrently be satisfied.

The adsorbent according to the present invention may be used for drying agents for organic solvents.

The drying agents according to the present invention include particles containing an adsorbing material coated with a porous coating layer. More specifically, since the surface of each of the core particles containing the adsorbing material is covered with porous coating layer, contamination by the fine dust is prevented, thereby providing availability of the solvents at higher cleanliness level. Further, the drying agent according to the present invention can be used in a safety condition, unlike using the sodium wire that is hazardous due to igniting when contacting water, and can provide convenience for disposing the material after the use. Further, the drying agent according to the present invention is a porous material, and also functions as zeolite, so that it is possible to use the drying agent of the present invention for the applications of reflux process or distill process.

Here, the porous coating layer should be composed of polymer material that is resistant to organic solvents. More specifically, the polymer material should not exhibit dissolving or swelling of the coating layer when the drying agent is immersed into the solvent. For example, the preferable materials may be: fluororesins; polyamide resins; polyimide resins; polyester resins; polystyrene resins; polyolefin resins; polycarbonate resins; polysulfone resins; acrylic resins; cellulose resins; vinyl chloride resins; polyacetal resins; polyurethane resins; and copolymers thereof, and may be suitably selected depending on the types of organic solvents.

Here, if the use for all types of solvents is expected, it is preferable to coat with the porous coating layer of fluororesins, and in particular, polytetrafluoroethylene is the most preferable choice.

The configuration of core particles and configuration and forming method of the porous coating layer are as described before.

The preferred embodiments of the drying agents for organic solvents will be described below.

EXAMPLE 13

First, for the purpose of preparing the drying agent according to the present invention, about 300 g of silica gel particles having a particle size of 0.55 mm were prepared, and about 100 g of a water suspension containing 20% wt. of polytetrafluoroethylene resin beads having a particle size of 0.1 µm was sprayed to the silica gel particles in a coarse and fine state, and thereafter the silica gel particles were dried. In this stage, observations of the particles were carried out by using a scanning electron microscope. The observation provided that the polytetrafluoroethylene resin beads were deposited and covered over the entire surface of the silica gel particles, and the thickness of the coating layer was about 5 µm.

Thereafter, the particles were baked by using a rotary kiln for 3 minutes at about 350° C. while air was fed therein, and after cooling the baked particles, the process from the coating process by spraying to the baking process by using the rotary kiln was repeated for three times in total to obtain the drying agent for organic solvents according to the present invention. The obtained drying agent was silica gel particles in a coarse and fine state, on the surface of which polytetrafluoroethylene resin coating layer of about 20 µm thick was formed. The polytetrafluoroethylene resin beads itself were mutually fused only at the contacting points thereof, thereby providing the porous polymer layer having an average size of the opening equivalent to 0.1 µm.

Next, 700 grains of the obtained drying agent were exposed to the gas flow of ultra pure nitrogen (flow rate: 1 L/min.) within a clean circular cylindrical vessel of 14 φ, and the number of particles within the recovered nitrogen gas was counted by the PM counter ("KC-10C", commercially available from LION CORPORATION), and the result shows that any contamination dust having diameter of not smaller than 0.3 µm was not found. Thus, it was confirmed that the adsorbent itself did not cause a problem of creating contamination dust.

Consequently, the drying ability was evaluated as follows. First, lime crushed by a hammer was fed into benzene (guaranteed reagent), and after carrying out the reflux process for 24 hours, the benzene was distilled to obtain anhydrous benzene. After the benzene was transferred to a container, the drying agent was fed into the anhydrous benzene the container was sealed, and the benzene containing the drying agent was stored in a refrigerator that was not capable of controlling the temperature and humidity for 4 weeks.

Thereafter, the container was opened in a dry box of dry nitrogen atmosphere, and 100 mL of the anhydrous benzene contained therein was heated in a 200° C. oven for 1 hour, and was transferred to a 200 mL eggplant type flask that had been dried by exposing burner flame. Then, 10 mL of titanium tetra (iso-propoxide) purified via vacuum distillation was aliquoted by using a syringe and injected therein, and after the injections, the flask was sealed and the liquid was stirred by using a magnet stirrer for 30 minutes.

The liquid was aliquoted and injected into FID-GC to measure the content of isopropyl alcohol. However, isopropyl alcohol was not detected. Therefore, it was found that no hydrolysis of metal alcoxide occurred, and therefore the solvent benzene was completely dried. Here, no contamination of the protection liquid or fine dust was, of course, found.

On the contrary, a comparative example was conducted by the same operations except that a sodium wire was fed into the above mentioned anhydrous benzene to evaluate the hydrolysis of metal alcoxide. The result was that although isopropyl alcohol was not detected, several peaks derived by hydrocarbons such as hexane in the chromatogram were recorded, which, in turn, indicates the presence of contamination of metallic sodium protection liquid.

As described above, the drying agents for organic solvents according to the present invention comprise core particles containing adsorbing material that are coated by porous coating layer, and since the porous coating layer is formed of polymer materials that are resistant to organic solvents, the drying agents according to the present invention can prevent the generation of the dusts from the adsorbing materials itself, and the adsorbability which the adsorbing material originally has can be fully exhibited even in the organic solvents, contamination of the protection liquid caused in the case of using sodium wire does not occur, additional operations such as disposing the wire after using the solvent are not necessary, and the contamination of fine dusts encountered in the case of using molecular sieve does not occur.

The adsorbent according to the present invention may be applicable to adsorbents for hard disk drives. A first aspect of the adsorbent for hard disk drives according to the present invention comprises the above-described adsorbent of the invention, and a planar sheet or a three-dimensional structure to which the adsorbent is fixed. A second aspect of the adsorbent for hard disk drives according to the present invention comprises the above-described adsorbent of the invention, and an air permeable material that wraps the adsorbent particles. Density of the particulate adsorbent fixed to the planar sheet or the three-dimensional structure may be 1 particle to 1,000,000 particles per 10 cm$^2$ for the planar sheet, and 1 particle to 1,000,000 particles per 1 cm$^3$ for the three-dimensional structure, to generally provide better adsorbability.

The number of the particulate adsorbent particles in the case of wrapping the particulate adsorbent particles with an air permeable material is suitably 1 particle to 100,000,000 particles. The value of the number or density may be suitably varied depending on type and morphology of the adsorbing material, and average particle size of the particulate adsorbent.

The particulate adsorbent may preferably be fixed onto the planar sheet or the three-dimensional structure to form a single particle layer to 1,000 particle layers. However, a single particle layer or a few particle layer may be preferable in view of obtaining better gas diffusion and better adsorbing efficiency.

The particulate adsorbent may simply be fixed onto the planar sheet or the three-dimensional structure by using adhesives. However, heat or high frequency may be used to fuse the particles thereto. Here, preferable adhesives may include organic solvent type adhesive, water type adhesive and hot melt type adhesive.

The particulate adsorbent may preferably be fixed onto both sides of the sheet or onto a single side of the sheet. However, if the particulate adsorbent is fixed onto a single side of the sheet and an adhesive is pasted onto the other side of the sheet, the sheet can be easily installed in a suitable space within the hard disk drive (HDD) when the sheet is to be installed within the HDD. Here, the adhesives may be of similar adhesives to ones used for fixing the particulate adsorbent, and for example the adhesive can be pasted onto the sheet surface.

Also, the particulate adsorbent fixed onto the planar sheet or the three-dimensional structure may be coated by an air permeable material. The air permeable material does not function as capturing the dust generated from the adsorbing material, but functions as preventing drop out of the particulate adsorbent from the planar sheet or the three-dimensional structure. Accordingly, the situation is similar to that the particulate adsorbent particles themselves are wrapped by the air permeable material without being fixed to the planar sheet or the three-dimensional structure, and thus a part of the sheet that easily releases the particles may be covered by the air permeable sheet as well as covering the entire particulate adsorbent, or the particulate adsorbent may be contained in the air permeable container. Further, when the particulate adsorbent is fixed onto the planar sheet, a multi layer structure of the particulate adsorbent which is sandwiched between a planar sheet and a permeable sheet may be provided. Here, the air permeable material may typically include unwoven cloth, woven cloth, mesh and net, and these are used in a form of a sheet or a container, but not particularly limited thereto, as long as the air permeable material can prevent the drop out of the particulate adsorbent and involves air permeability.

The factors that affect the adsorbability may include an apparent surface area of the planar sheet or the three-dimensional structure, and an apparent surface area of the air permeable material that wraps the particulate adsorbent particles. These apparent surface areas can be adjusted to a suitable value depending on the volume of the HDD, the number of parts used in the HDD, cleanliness, quantity of the adhesive to be used and so on, and preferably within a range of 1 mm$^2$ to 10,000,000 mm$^2$ The apparent surface within this range may provide excellent adsorbability.

Also, thickness of the planar sheet or the three-dimensional structure, on which the particulate adsorbent particles are fixed, is preferably 1 $\mu$m to 100,000 $\mu$m. The thickness within this range may provide better adsorbability and may promote the installation of the sheet into the HDD.

The preferred embodiments of the adsorbents for hard disk drives will be described below.

EXAMPLE 14

First, for the purpose of preparing the adsorbent according to the present invention, a water suspension including 20% wt. of polystyrene resin beads having a particle size of about 0.1 $\mu$m was prepared via an ordinary emulsion polymerization and an ordinary purification. Then, a cumulative 200 g of the above mentioned suspension was sprayed to 300 g of core particles of crushed activated carbon (produced from the palm shell, particle size of between 30-mesh and 20-mesh) by using a powder coating machine of a type of air blowing convection processing, and consequently a drying process was carried out therein. It was observed via a scanning electron microscope image photo of ×15,000 of the dried product that the coarse and fine coating layer of polystyrene resin particles having particle size of 0.1 $\mu$m was formed on the surface of the activated carbon particles.

The resultant particles were thermally processed at 150° C. in the powder dryer so that the polystyrene resin particles on the coating layer can be mutually fused only at the contacting point thereof to convert the coating particles to a porous film, thereby obtaining the particulate adsorbent. 60 particles of the obtained particulate adsorbent were fixed onto one side of a double-sided adhesive tape of 10 mm×10 mm in a single particle layer to obtain the adsorbent according to the present invention.

The adsorbent was laminated at one position on an inner wall of the clean glass tube of 20 $\phi$, and the ultra pure nitrogen gas was flowed through the tube at a volumetric flow rate of 2 L/min. The detection of the fine dust was conducted for the recovered exhaust gas by using a laser scattering type particle measuring machine. No carbon particle having particle size of not smaller than 0.3 $\mu$m was detected. Therefore, it was confirmed that no dust was emitted from the adsorbing material itself.

Consequently, the adsorbent according to the present invention was affixed onto the backside of a lid of a 3.5 inch HDD, and thereafter the HDD was assembled. Ultra pure helium gas was introduced into the HDD via one opening of two openings formed in the lid while the HDD was operated, and the exhaust gas was recovered via another opening in the lid, and the recovered gas was transferred to a gas concentration apparatus, and then the concentrated gas sample was introduced to a gas chromatograph with mass spectrometer to measure the concentration of DOP compounds and paraffin compounds in the gas. The result showed that the numbers of peaks and peak heights were considerably reduced, comparing with a case in which no adsorbent was inserted into the HDD. Therefore, it was confirmed that the level of adsorbability thereof was sufficient.

As described above, since the adsorbent for the HDD according to the present invention comprises the particulate adsorbent including the adsorbing material particles coated with the porous coating layer which is fixed onto the planar sheet or the three-dimensional structure, or the particulate adsorbent including the adsorbing material particles wrapped by the air permeable material without being fixed thereto, the adsorbent according to the present invention can prevent the generation of the dusts from the adsorbing materials itself, and the adsorbability which the adsorbing material originally has can be fully exhibited while preventing the internal contamination of the HDD, and satisfactorily remove the moisture (water) and organic gases within the HDD.

The adsorbent according to the present invention may be used for freshness keeping members.

In this application, the adsorbing materials contained in the core particles may typically be activated carbon, silica gel, alumina gel, zeolite, diatomearth, or mixture thereof, but not be particularly limited as long as the adsorbing material can adsorb ethylene gas that causes deterioration of freshness. Also, the adsorbing material more preferably adsorbs and removes odor materials generated in a storage space for vegetables and fruits as well as ethylene gas, to eliminate bad odor that creates feeling of disgust.

Activated carbon is an example of the adsorbing material that satisfies these requirements. Further, it can improve the adsorbability of the activated carbon to bad odor by additionally impregnating the activated carbon. For example, the activated carbon can be impregnated with an acidic material such as phosphoric acid and polyphosphoric acid to provide improved adsorbability to ammonia and/or amines, and impregnated with alkali metal hydroxide salt to provide improved adsorbability to sulfides such as hydrogen sulfide and methyl mercaptan.

The core particles may additionally include an oxidizing agent as well as the adsorbing material. Presence of the oxidizing agent additionally provides the oxidative destruction ability for ethylene gas as well as adsorbability for ethylene gas, thereby providing additionally improved freshness keeping performance.

In such a case, the available oxidizing agent may preferably be a mixture of ascorbic acid and an iron containing compound in a mixing ratio of ascorbic acid: the iron containing compound=1:0.001 to 1:1,000 (ratio by weight), or may preferably be permanganates, manganese dioxide, chromates, dichromates, osmium tetraoxide, ruthenium tetraoxide, silver oxide, palladium chloride and the like. Here, the iron containing compound typically includes iron chloride, iron bromide, iron iodide, iron oxide, iron perchlorate, iron thiocyanate, iron sulfate, iron sulfide, iron acetate, iron thiocyanate, Mohr's salt, diiron monophosphide, triiron monophosphide and so on.

The configuration of core particles and configuration and forming method of the porous coating layer are as described before, but in particular, the core particles having a form of true sphere are preferable in view of obtaining better packing density, better effective surface area, tempered mechanical load onto stored vegetables and fruits.

In the freshness keeping members according to the present invention, the porous coating layer prevents permeation of water, thereby protecting the core particles containing adsorbing material from water drops. In other words, the core particles containing adsorbing material are not wet. Materials for porous coating layer that coats the core particles may preferably be selected so as to minimize the permeation of water therein, and fluororesin, which has better water repellency, is the particularly preferable choice.

In the freshness keeping member according to the present invention, silver may be deposited onto the surface of the porous coating layer via methods such as sputtering. Depositing silver thereon may provide bacterial resistance to the surface of the porous coating layer, and the bactericidal action to bacteria being present on vegetables and fruits may promote the performances of freshness keeping ability at higher level. In such case, a suitable quantity of silver deposited thereon may be selected so as not to deteriorate air permeability of the porous coating layer.

The freshness keeping member according to the present invention does not generate dust, and thus the freshness keeping member can be disposed within a storage bag or storage container in a particulate form without being wrapped. The freshness keeping member may be used by being fixed to a structure of one dimension, two dimensions or three dimensions.

Further, the freshness keeping member can be used by being coated with an air permeable sheet, or by being contained in an air permeable container.

The one-dimensional structure may be illustrated by linear structure or strap like structure, the two-dimensional structure may be illustrated by sheet like structure or plate like structure. The three-dimensional structure may be preferably illustrated by stereostructure or three-dimensional skeleton structure.

The freshness keeping member may preferably be fixed to a three-dimensional structure having cushioned material such as a foam, because the freshness keeping member can obtain functions of protecting the vegetables and fruits from external mechanical shock and contact load or sliding load occurred between vegetables, as well as having freshness keeping ability. Such structure may typically include foamed polyolefin and polyurethane foam.

In considering the gas exchanging ability thereof, it may be advantageous to employ particulate or powder form of the freshness keeping member according to the present invention to provide larger surface area thereof for the purpose of improving the adsorbability. Also, in the case of fixing the particles of the freshness keeping member onto the above mentioned structure, it may be advantageous to fix the particles of the freshness keeping member in a single particle layer or the like, and in up to 1,000 particle layers at maximum, for the purpose of introducing as many particles as possible to improve adsorbability thereof.

In the case of fixing the freshness keeping member to the two-dimensional structure such as sheet like structure, the fixing density of the particles may be preferably 0.1 to 100,000 particles of the freshness keeping member for 1 cm$^2$ of the surface of the two-dimensional structure, and more preferably 100 to 1,000 particles or particle weight of 0.1 to 1.0 g for 1 cm$^2$ of the two-dimensional structure. In the case of fixing the freshness keeping member to the three-dimensional structure such as solid material, the fixing density of the particles may be preferably 1 to 1,000,000 particles of the freshness keeping member for 1 cm$^3$ of the volume of the three-dimensional structure, and more preferably 100 to 10,000 particles or particle weight of 0.1 to 1.0 g for 1 cm$^3$ of the volume of the three-dimensional structure. These preferable ranges may provide better adsorbability.

The freshness keeping member may be fixed to the structure described above by using self-adhesive or adhesive, and other method such as using heat, high frequency or supersonic wave may be employed.

Also, when the freshness keeping member is fixed onto one surface of the two-dimensional structure such as sheet like structure, a self-adhesive may be pasted onto another surface thereof, and the structure may be glued to a suitable location of the inner surface of the refrigerator.

The available self-adhesives may typically include organic solvent type adhesives, water type adhesives and hot melt type adhesives.

The structure having affixed freshness keeping member thereon may be covered by an air permeable sheet or contained within an air permeable container. In such a case, the air permeable sheet or the air permeable container does not function as capturing the dust or the oxidizing agent powder generated from the adsorbing material, but functions as preventing drop out of the freshness keeping member from the structure. In the case of wrapping them with the air permeable sheet, the entire structure having affixed freshness keeping member may be wrapped, or only a part thereof may be wrapped.

When the freshness keeping member is fixed onto the two-dimensional structure such as a planar sheet, the particulate adsorbent may be wrapped with the air permeable sheet so that the freshness keeping member is sandwiched between a planar sheet and a permeable sheet.

Here, the structure having affixed freshness keeping member thereon or, the air permeable sheet for wrapping the freshness keeping member may typically include unwoven cloth, woven cloth, mesh and net, but not particularly limited thereto, as long as the air permeable sheet can prevent the drop out of the freshness keeping member and involves air permeability.

Also, the structure having affixed freshness keeping member thereon or, the air permeable container for housing the freshness keeping member may typically include structure or container made of unwoven cloth, woven cloth, mesh and net, but not particularly limited thereto for the air permeable container.

The preferred embodiments of the freshness keeping member will be described below.

EXAMPLE 15

350 g of core particles of crushed activated carbon (between 20-mesh and 14 mesh) derived by the palm shell were introduced to the powder coating machine ("MP-01", commercially available from POWREX CORPORATION), and the activated carbon particles were convected at air feeding temperature of 60° C., air feeding flow rate of 80 m$^3$/hr., and revolution speed of a tri-blade bottom rotor of 300 rpm to create convectional movement of the activated carbon particles.

On the other hand, a suspension of polytetrafluoroethylene resin fine powder ("POLYFRON D-1", commercially available from DAIKIN INDUSTRIES Co., Ltd.) was diluted with distilled water to prepare a suspension containing solid contents of 20% wt, and 150 g of the suspension was sprayed along the tangential direction of the rotating bottom rotor over the convecting activated carbon particles at an injection rate of 9.5 g/min. from a dual fluid nozzle having a nozzle diameter of 1.2 mm. The first coating process was completed when the exhaust temperature was increased to 50° C. after the spraying process was completed.

The processed particles were recovered from the powder coating machine, and the particles were observed via optical microscopy and scanning electron microscopy. The observation showed that the entire surface of the activated carbon particles was covered with particles of polytetrafluoroethylene resin fine powder having a particle size of about 0.1 $\mu$m. The cutting cross sectional plane thereof was also observed via scanning electron microscopy, and it was confirmed that the thickness of the coating layer was 5 $\mu$m.

These particles were baked in the auger-built-in rotary kiln at 345° C. for about 5 minutes, and 350 g of the baked particles were processed via the aforementioned coating and baking processes again, to obtain the freshness keeping member of the present invention. The resultant freshness keeping member was observed via optical microscopy and scanning electron microscopy, and it was confirmed that the particles of polytetrafluoroethylene resin fine powder having diameter of approximately 0.1 $\mu$m were mutually fused at the contacting point thereof to form the porous film.

On the surface image of the scanning electron microscope photograph, an image processing was carried out, in which the surface area that was not occupied by the fine powder particles was assumed to be the area of the aperture, and the aperture diameter of the surface was calculated to be 0.05 $\mu$m to 0.1 $\mu$m based on the assumption for the image processing described above. Further, it was confirmed that value of the calculated aperture diameter of the cutting cross sectional plane was approximately identical to the value of the calculated aperture diameter of the surface according to the image processing for the image of the cutting cross sectional plane. It was also confirmed that the entire surface of the activated carbon particles was substantially uniformly covered with polytetrafluoroethylene resin fine powder. The thickness of the coating layer was also calculated to be about 10 μm to 20 μm from the scanning electron microscope photograph image of the cutting cross sectional plane. Further, the porosity measured via the aforementioned porosity measurement method was 50%.

A flexible polyurethane foam having no film and having flexibility ("SF#06", commercially available from BRIDGESTONE CORPORATION) was cut to a size of 25 mm×25 mm×5 mm thick, and the piece was coated with acrylic type binder, then after the surplus binder was removed, the particulate freshness keeping member particles obtained above were sprinkled on the surface of the foam and pressurized to adhere thereto, thereby fixing the freshness keeping member particles on one surface of the foam at a density of 0.1 g (350 particles) per 1 $cm^2$ to obtain the freshness keeping member of the present invention.

The freshness keeping ability of the freshness keeping member was evaluated by the following method.

Spinach was selected to be a vegetable sample, and 60 g of the spinach and 5 g of water were fed into a polyethylene bag of 120 μm thick together with the above mentioned freshness keeping member, and the bag was left for 4 days at a room temperature (25° C.). Three spinach samples were simultaneously evaluated. After 4 days had passed, appearance, level of foreign odor and green color level were evaluated for these spinach samples.

Appearance was evaluated by visible observation. Measurements of level of foreign odor was conducted by using a resistive odor sensor (commercially available from SHIN COSMOS DENKI Co., Ltd.) Larger value of the sensor presents higher level of foreign odor.

The green color level was evaluated by the following method. The entire amount of the sample was homogenized with adding water by using a homogenizer for tissues, and after the homogenized sample was vacuum filtered by using polyvinylidene fluoride membrane (commercially available from MILLIPORE, pore size of 0.2 μm), the sample was diluted with water to be 1000 mL in total, and the absorption spectrophotometry of the resultant solution was conducted for wave length of 400 nm to 660 nm by using a KLETT absorption spectrophotometric device to obtain the integral value of the absorption spectrophotometry, and the obtained value was compared with the value of the fresh sample before stored and was relativized provided that the value of the fresh sample was 100.

The results are shown in TABLE-2

COMPARATIVE EXAMPLE 5

The freshness of spinach was evaluated by the similar method to that of Example 15 except that no freshness keeping member was fed in the polyethylene bag, and the obtained results are shown in TABLE-2.

TABLE 2

| | level of foreign odor | appearance | green level |
|---|---|---|---|
| Example 15 | 70 +/− 4 | water drop on the leaf was transparent | 60 +/− 7 |
| Comparative Example 5 | 210 +/− 12 | water drop on the leaf was brown: a part of leaf was smelted | 8 +/− 2 |

According to TABLE-2, the system of using the freshness keeping member according to the present invention provides lower level of foreign odor, better appearance, and considerably lower level of deterioration of green color level, and therefore it was confirmed that the freshness keeping member provided better freshness keeping effect. Further, contamination dust did not generate from the adsorbing material and no deterioration of adsorbability of the freshness keeping member due to water drops was occurred.

As described above, the freshness keeping member, which is provided according to the present invention, does not generate dust from the adsorbing material, and involves better freshness keeping ability without deteriorating the adsorbability even when the freshness keeping member contacts water drop.

Next, the ambiance humidity regulating members according to the present invention will be described.

The ambiance humidity regulating member according to the present invention comprises core particles containing at least one humidity regulating material selected from the group consisting of organic acids, organic acid salts, inorganic acids and inorganic acid salts, and a porous coating layer including a polymer material coating the core particles.

Acids and/or salts thereof may be employed for the humidity regulating material. Available acids may be selected from the group consisting of lactic acid, malic acid, tartaric acid, oxalic acid, chromic acid, dichromic acid, manganic acid, permanganic acid, thiocyanic acid, cyanic acid, carbonic acid, hydrochloric acid, perchloric acid, chloric acid, chlorous acid, hypochlorous acid, hydriodic acid, periodic acid, iodic acid, iodous acid, hypoiodous acid, sulfuric acid, sulfurous acid, nitric acid, nitrous acid, phosphoric acid, and mixture thereof. Available salts may be salts of alkali metal, salts of alkali earth metal and salts of ammonium containing hydrogen or without hydrogen.

The preferable humidity regulating materials may be alkali metal salts or ammonium salts of sulfuric acid or phosphoric acid, in view of providing better stability after the deliquescence thereof. More specifically, at least one of sodium sulfate, alkali metal salts (sodium salts or potassium salts) of phosphoric acid, alkali metal salts (sodium salts or potassium salts) of hydrogen phosphate, ammonium salts of phosphoric acid and ammonium salts of hydrogen phosphate is preferable.

The particles may additionally contain hydrophilic polymer compounds. Mixing hydrophilic polymer compounds may provide improvements on water retention ability and strength of core particles, and thus improve the humidity regulating effect thereof. The available hydrophilic polymer compounds may be at least one of polymer of: vinyl alcohol, vinylpyrrolidone, acrylic acid, methacrylic acid, saponification compound of vinyl acetate, cellulose ester, oxyolefin, sugar and the like, and the quantity thereof may be not higher than 75% wt. of the content of core particle, and more preferably not higher than 50% wt. thereof.

The core particles may preferably have an average particle size of 0.01 mm to 100 mm, and particularly 0.1 mm to 1.0 mm, in view of obtaining better handling ability, and better contacting efficiency with ambient air.

The polymer material for coating the core particles, and the forming method thereof are selected to aforementioned ones described in the description on the adsorbent of the present invention.

In considering the resistance to organic acids, inorganic acids and salts thereof, and capturing ability of water (liquid), fluororesin is preferable for the polymer material for forming the polymer porous layer, and polytetrafluoroethylene resin is more preferable.

The film thickness of the porous coating layer formed of these polymer materials may be 0.1 $\mu$m to 1,000 $\mu$m, and more preferably 5 $\mu$m to 50 $\mu$m, and the average pore size may be 0.001 $\mu$m to 50 $\mu$m, and more preferably 0.01 $\mu$m to 1.0 $\mu$m, in view of consisting the water vapor permeability with capturing ability to deliquescent material or water (liquid) at higher level.

Also, the porosity of the porous coating layer may be 3% to 90%, in view of consisting the water vapor permeability with capturing ability to deliquescent material or water (liquid) at higher level.

The porous coating layer may be formed by the method similar to that for the porous coating layer of the adsorbent according to the present invention.

The porous coating layer can be colored. The appearance of the ambiance humidity regulating member can be improved by coloring the ambiance humidity regulating member to have a color tone that matches the surrounding background of the place where the ambiance humidity regulating member is located, and further, the ambiance humidity regulating member having different levels of adsorbability can be readily identified by providing different colors corresponding to their levels of adsorbability, and thus this provides higher value-added product.

The ambiance humidity regulating member according to the present invention may be housed as it is or inserted into an air permeable case, to be located in a closet, a room, or a storage case. The ambiance humidity regulating member of the present invention may be adhered onto a surface of two-dimensional or three-dimensional structure by adhesives and so on. The ambiance humidity regulating member may also be directly adhered onto a wall or a ceiling by adhesives.

The preferred embodiments will be described as follows.

EXAMPLE 16

Sodium sulfate anhydrous salt powder was agglomerated via the fluidized bed method to form core particles having an average particle size of 0.6 mm. 150 g of the core particles were introduced to the powder coating machine ("MP-01", commercially available from POWREX CORPORATION), and the core particles were convected at air feeding temperature of 60° C., air feeding flow rate of 80 m$^3$/hr., and revolution speed of a tri-blade bottom rotor of 300 rpm to create convectional movement of the core particles.

On the other hand, a suspension of polytetrafluoroethylene resin fine powder ("POLYFRON D-1", commercially available from DAIKIN INDUSTRIES Co., Ltd.) was diluted with distilled water to prepare a suspension containing solid contents of 20% wt, and 150 g of the suspension was sprayed along the tangential direction of the rotating bottom rotor over the convecting core particles at an injection rate of 9.5 g/min. from a dual fluid nozzle having a nozzle diameter of 1.2 mm. The first coating process was completed when the exhaust temperature was increased to 50° C. after the spraying process was completed.

The processed particles were recovered from the powder coating machine, and the particles were observed via optical microscopy and scanning electron microscopy. The observation showed that the entire surface of the core particles was covered with particles of polytetrafluoroethylene resin fine powder having a particle size of about 0.1 $\mu$m. The cutting cross sectional plane thereof was also observed via scanning electron microscopy, and it was confirmed that the thickness of the coating layer was about 5 $\mu$m.

These particles were baked in the auger-built-in rotary kiln at 345° C. for about 5 minutes, and 150 g of the baked particles was processed via the aforementioned coating and baking processes again, to obtain the ambiance humidity regulating member of the present invention. The resultant ambiance humidity regulating member was observed via optical microscopy and scanning electron microscopy, and it was confirmed that the particles of polytetrafluoroethylene resin fine powder having particle size of approximately 0.1 $\mu$m were mutually fused at the contacting point thereof to form the porous film.

On the surface image of the scanning electron microscope photograph, an image processing was carried out, in which the surface area that was not occupied by the fine powder particles was assumed to be the area of the aperture, and the aperture diameter of the surface was calculated to be 0.05 $\mu$m to 0.1 $\mu$m based on the assumption for the image processing described above. Further, it was confirmed that value of the calculated aperture diameter of the cutting cross sectional plane was approximately identical to the value of the calculated aperture diameter of the surface according to the image processing for the image of the cutting cross sectional plane. It was also confirmed that the entire surface of the core particles was substantially uniformly covered with polytetrafluoroethylene resin fine powder. The thickness of the polymer coating film of the coating layer was also calculated to be about 10 $\mu$m to 20 $\mu$m from the scanning electron microscope photograph image of the cutting cross sectional plane.

Further, the porosity measured via the aforementioned porosity measurement method was 50%.

[Tests for Evaluating Humidity Regulating Ability]

The humidity regulating ability of the ambiance humidity regulating member was evaluated according to the method described below.

300 g of a saturated aqueous solution of 12-hydrate potassium dihydrogenphosphate was disposed in a circular tray having a diameter of 150 mm within a 3 L glass desiccator having a gas collecting opening, and then the desiccator was sealed to obtain a space in which relative humidity thereof was 90% to 100%. 30 g of the above mentioned ambiance humidity regulating member was uniformly fixed onto entire surface of a circular polypropylene sheet having a diameter of 150 mm via a double-sided adhesive tape, and the polypropylene sheet having the ambiance humidity regulating member thereon was placed on the backside of a lid of the desiccator so that the surface of the sheet having the ambiance humidity regulating member thereon faced to the interior of the desiccator.

Figure 20:
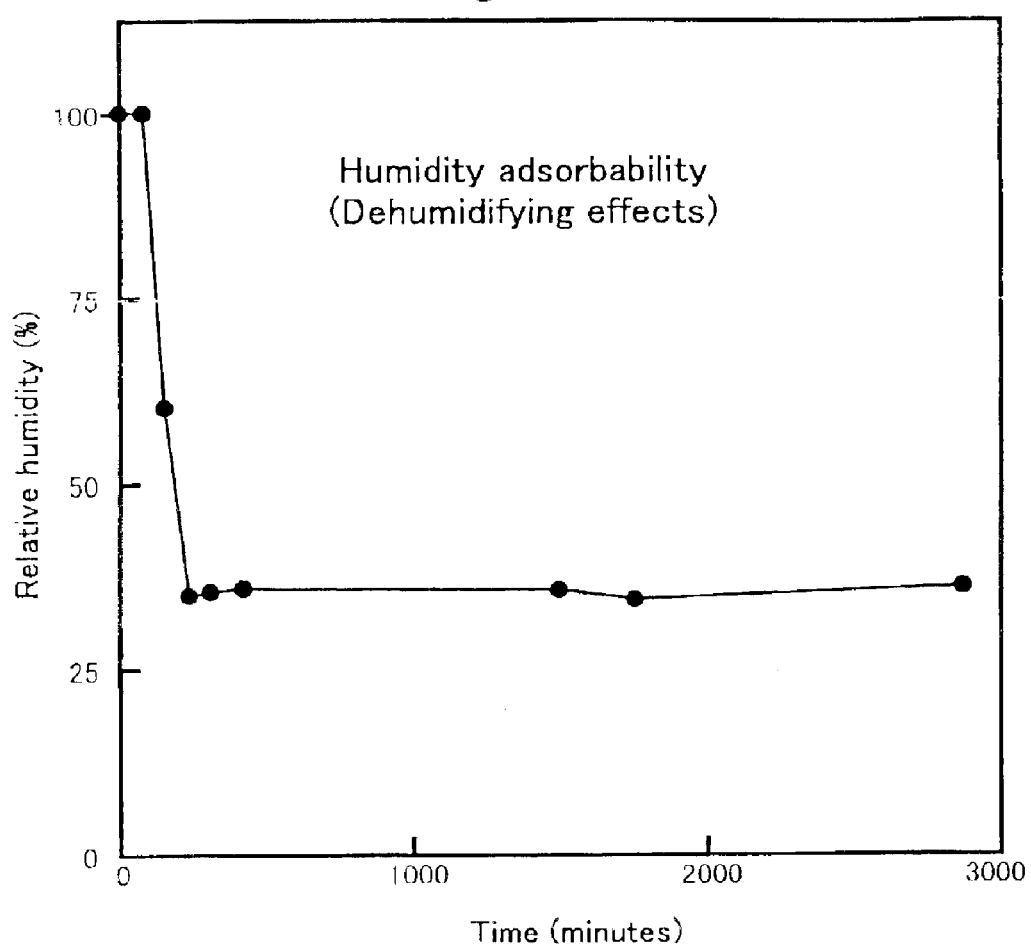
FIG. 20 is a graph showing the ability of regulating humidity (humidity adsorbing ability) of the ambient humidity regulating material obtained in Example 16.

A front edge of a gas detection tube for water vapor ("Gas detection tube No. 6", commercially available from GASTECH CORPORATION) was inserted into the desiccator via the gas collecting opening of the desiccator, and 100 ml of the internal gas was sucked and the obtained gas was tested to measure a water vapor concentration thereof. Relative humidity was calculated by using a temperature at the time of measurement, and the calculated results indicated that the relative humidity varied as shown in FIG. 20. According to FIG. 20, it was confirmed that this ambiance humidity regulating member had a dehumidifying effect, and that the relative humidity in the desiccator was stable within a range of 30% to 40% and did not decrease from this level.

When the measurement was ended, it was confirmed that the particles of the ambiance humidity regulating member were softened, and that the sodium sulfate particles were deliquescent. However, no leakage of the deliquescence sodium sulfate or water was observed.

Figure 21:
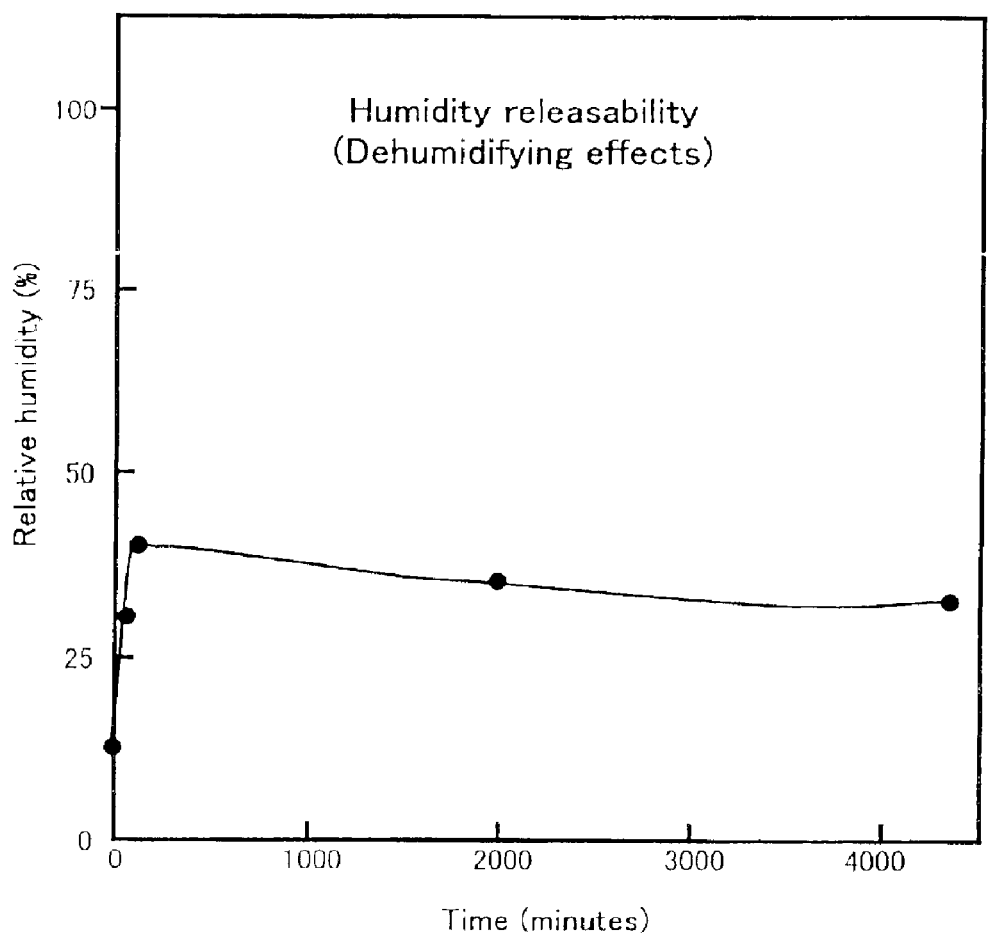
FIG. 21 is a graph showing the ability of regulating humidity (humidity releasing ability) of the ambient humidity regulating material obtained in Example 16.

Next, the polypropylene sheet having the fixed ambiance humidity regulating member thereon was transferred into a desiccator that had been dried at 110° C., and water vapor concentration was measured in the similar manner, and the results of the measurements indicated the humidity variation as shown in FIG. 21.

According to FIGS. 20 and 21, it was confirmed that the ambiance humidity regulating member had a humidity regulating ability in which the moisture uptake was occurred in an atmosphere of higher humidity and the moisture was released in an atmosphere of lower humidity.

As described above, the ambiance humidity regulating member according to the present invention can be used for longer term because the ambiance humidity regulating member has moisture uptake ability and moisture release ability, and provides no problem of the leakage of liquids such as deliquescence material and adsorbed water. Also, since the ambiance humidity regulating member according to the present invention does not require using a container or an air permeable sheet, the ambiance humidity regulating member can be placed to a location where no wider space is included. Further, the ambiance humidity regulating member having superior performances, in which an uniform and better moisture uptake ability and moisture release ability can be obtained at any portions thereof, is provided.

What is claimed is:

1. An adsorbent comprising:
   core particles containing an adsorbing material;
   a porous coating layer including a polymer material that coats said core particles; and
   an underlying layer containing a metal compound and a water-soluble polymer and disposed between the core particles and the porous coating layer, said water-soluble polymer being at least one selected from the group consisting of polymers of sugar, cellulose derivatives, alginic acid, methacrylic acid, acrylic acid, vinylpyrrolidone, vinyl alcohol, and oxyolefins.

2. The adsorbent according to claim 1, wherein said adsorbing material is at least one selected from the group consisting of activated carbon, an inorganic oxide, a compound having ion exchange capacity and a modified compound thereof, an ion exchange resin, and a chemical deodorizer.

3. The adsorbent according to claim 2, wherein said inorganic oxide is at least one selected from the group consisting of silica gel, alumina gel, zeolite, a molecular sieve, diatomearth and iron oxide.

4. The adsorbent according to claim 2, wherein said compound having ion exchange capacity is at least one selected from the group consisting of chitosan, dextran sulfate, polyallylamine, sulfonated polystyrene resins, polyacrylic acid, polymethacrylic acid and a derivative thereof.

5. The adsorbent according to claim 1, wherein said polymer material is at least one selected from the group consisting of a fluororesin, a polyamide resin, a polyimide resin, a polyester resin, a polystyrene resin, a polyolefin resin, a polycarbonate resin, a polysulfone resin, an acrylic resin, a cellulose resin, a vinyl chloride resin, a polyacetal resin, a polyurethane resin and a copolymer thereof, and a derivative thereof.

6. The adsorbent according to claim 1, wherein said polymer material is at least one selected from the group consisting of polytetrafluoroethylene, polyhexafluoropropylene, polydifluoroethylene, polyvinyliden fluoride, polyvinyl fluoride, and a copolymer thereof.

7. The adsorbent according to claim 1, wherein said porous coating layer has a thickness of 0.01 µm to 1,000 µm.

8. The adsorbent according to claim 1, wherein said porous coating layer has an average pore diameter of 0.01 µm to 500 µm.

9. The adsorbent according to claim 1, wherein said porous coating layer has a porosity of 3% to 90%.

10. The adsorbent according to claim 1, wherein said core particles are formed by a tableting process.

11. The adsorbent according to claim 1, wherein said porous coating layer is colored.

12. The adsorbent according to claim 1, wherein said metal compound is at least one selected from the group consisting of oxide, hydroxide, carbonate, sulfates, phosphate, metasilicate, borate, oxalate, tungstate, molybdate, vanadate, chromate, selenate, and manganate of a metal.

13. The adsorbent according to claim 1, wherein said metal compound contains at least one metal selected from the group consisting of titanium, zirconium, silicon, zinc, iron, manganese, aluminum, magnesium, nickel, copper, silver, barium, calcium, scandium, bismuth, molybdenum, niobium, neodymium, antimony, selenium, stannum, strontium, terbium, tellurium, thorium, and yttrium.

14. The adsorbent according to claim 1, wherein said metal compound has a particulate shape having an average particle size of 0.001 µm to 50 µm.

15. The adsorbent according to claim 1, wherein said underlying layer has a thickness of 1 µm to 10,000 µm.

16. The adsorbent according to claim 1, wherein said core particles having said porous coating layer formed thereon are fixed on a member having a one-dimensional structure.

17. The adsorbent according to claim 1, wherein said core particles having said porous coating layer formed thereon are fixed on a member having a two-dimensional structure.

18. The adsorbent according to claim 17, wherein said core particles are fixed onto said member having the two-dimensional structure at a density of 0.1 to 100,000 particles per 1 $cm^2$ of a surface of said member having the two-dimensional structure.

19. The adsorbent according to claim 17, wherein said core particles having said porous coating layer formed thereon are fixed on one surface of said member having the two-dimensional structure, and an adhesive is applied on another surface of said member having the two-dimensional structure.

20. The adsorbent according to claim 1, wherein said core particles having said porous coating layer formed thereon are fixed on a member having a three-dimensional structure.

21. The adsorbent according to claim 20, wherein said core particles are fixed onto said three-dimensional structure at a density of 1 to 1,000,000 particles per 1 $cm^3$ of a volume of said member having the three-dimensional structure.

22. The adsorbent according to claim 1, wherein said core particles having said porous coating layer formed thereon are fixed to a member in a state of a layer having a thickness of a single particle to 1,000 particles.

23. The adsorbent according to claim 22, wherein said core particles having said porous coating layer formed thereon are fixed to the member with an adhesive.

24. The adsorbent according to claim 23, wherein said adhesive is an organic solvent type adhesive, a water type adhesive or a hot melt, type adhesive.

25. The adsorbent according to claim 22, wherein said member includes a portion covered by an air permeable sheet.

26. The adsorbent according to claim 22, wherein said member is entirely wrapped with an air permeable sheet.

27. The adsorbent according to claim 22, wherein said member is contained in an air permeable container.

28. The adsorbent according to claim 27, wherein said air permeable container is composed of an unwoven cloth, a woven cloth, a mesh, or a net.

29. The adsorbent according to claim 1, wherein said core particles having said porous coating layer formed thereon are wrapped with an air permeable sheet.

30. The adsorbent according to claim 29, wherein said core particles having said porous coating layer formed thereon are contained in the air permeable sheet in a number of 1 to 100,000,000.

31. The adsorbent according to claim 29, wherein said air permeable sheet is composed of an unwoven cloth, a woven cloth, a mesh, or a net.

32. A dehumidifying material for dehumidifying gas in a dual-glass window comprising the adsorbent according to claim 1.

33. A drying agent for drying an organic solvent comprising the adsorbent according to claim 1.

34. An adsorbent for a hard disk drive comprising the adsorbent according to claim 1.

35. A freshness keeping member comprising the adsorbent according to claim 1.

36. The freshness keeping member according to claim 35, wherein said core particles further comprises an oxidizing agent.

37. The freshness keeping member according to claim 36, wherein said oxidizing agent is at least one selected from the group consisting of a mixture of ascorbic acid and an iron-containing compound, permanganates, manganese dioxide, chromates, dichromates, osmium tetraoxide, ruthenium tetraoxide, silver oxide and palladium chloride.

38. The freshness keeping member according to claim 37, wherein said iron-containing compound is at least one selected from the group consisting of iron chloride, iron bromide, iron iodide, iron oxide, iron perchlorate, iron thiocyanate, iron sulfate, iron sulfide, iron acetate, iron oxalate, Mohr's salt, diiron monophosphide and triiron monophosphide.

39. The freshness keeping member according to claim 36, wherein said porous coating layer includes a silver deposit layer.

40. An indoor ambient air cleaning member comprising the adsorbent according to claim 1, wherein said adsorbing material adsorbs a toxic gas present within indoor ambience.

41. An air cleaning machine comprising a cylindrical vessel containing the adsorbent according to claim 1, and a device for introducing air into said cylindrical vessel, wherein said adsorbent is freely moved when the air is introduced therein.

42. The air cleaning machine according to claim 41, wherein said cylindrical vessel is tilted.

43. A method for producing the adsorbent according to claim 1, comprising forming the coating layer by applying a liquid containing said polymer material onto a surface of said core particles.

44. The method according to claim 43, wherein said coating layer is formed by spraying said liquid over said core particles.

45. The method according to claim 43, wherein said coating layer is formed by immersing said core particles into said liquid.

46. The method according to claim 43, wherein said liquid is a suspension of said polymer material.

47. The method according to claim 43, wherein said liquid is a solution of said polymer material.

48. The method according to claim 43, wherein, during said step of forming the coating layer or after said step of forming the coating layer, at least one of a step of heating and a step of decreasing a pressure is carried out to draw said porous coating layer.

49. The method according to claim 43, wherein, during said step of forming the coating layer or after said step of forming the coating layer, a heating process is carried out so that said coating layer partially shrinks and partially expands.

50. The method according to claim 43, wherein said core particles in said step of forming the coating layer are in a water-containing state, in an oil-containing state, or in a frozen state thereof.

51. The method according to claim 43, wherein said liquid contains a pore-forming agent.

52. The method according to claim 51, wherein said pore-forming agent is a water-soluble polymer or oligomer.

53. The method according to claim 52, wherein said water-soluble polymer or oligomer is at least one selected from the group consisting of cellulose, poly(oxyolefin), polyvinylpyrrolidone, polyvinyl alcohol, a saponification compound of polyvinyl acetate, polyacrylic acid, polymethacrylic acid, and a derivative thereof.

54. The method according to claim 53, wherein said water-soluble polymer or oligomer is at least one selected from the group consisting of methyl cellulose, hydroxymethyl cellulose, hydroxyethyl cellulose, hydroxypropyl cellulose, polyvinylpyrrolidone, polyvinyl alcohol, polyethylene glycol, polypropylene glycol and a derivative thereof.

55. The method according to claim 51, wherein said pore-forming agent is an oil soluble polymer or oligomer.

56. The method according to claim 55, wherein said oil soluble polymer is liquid paraffin.

57. The method according to claim 51, wherein said pore-forming agent is removed during or after the step of forming said coating layer.

58. The method according to claim 57, wherein said pore-forming agent is removed by extraction, evaporation, sublimation or combustion thereof.

59. A method for cleaning air comprising contacting air with an indoor ambient air cleaning member including the adsorbent according to claim 1.

60. The method for cleaning air according to claim 59, wherein said adsorbent is contained in a cylindrical vessel, and said indoor ambient air cleaning member is freely convected when the air is introduced therein.

61. The method for cleaning air according to claim 60, wherein said cylindrical vessel is tilted.

62. An ambiance humidity regulating member, comprising core particles containing at least one humidity-regulating material of an acid, and a porous coating layer including a polymer material that coats said core particles, said acid being at least one selected from the group consisting of lactic acid, malic acid, tartaric acid, oxalic acid, chromic acid, dichromic acid, manganic acid, permanganic acid, thiocyanic acid, cyanic acid, carbonic acid, hydrochloric acid, perchloric acid, chloric acid, chlorous acid, hypochlorous acid, hydriodic acid, periodic acid, iodic acid, iodous acid, hypoiodous acid, sulfuric acid, sulfurous acid, nitric acid, nitrous acid, and phosphoric acid.

63. The ambiance humidity regulating member according to claim 62, wherein said core particles further contains a hydrophilic polymer compound.

64. The ambiance humidity regulating member according to claim 63, wherein said hydrophilic polymer compound is at least one selected form the group consisting of vinyl alcohol, vinylpyrrolidone, acrylic acid, methacrylic acid, a saponification compound of vinyl acetate, a cellulose ester, an oxyolefin, and a sugar.

65. The ambiance humidity regulating member according to claim 62, wherein said core particles have an average particle size of 0.01 mm to 100 mm.

66. The ambiance humidity regulating member according to claim 62, wherein said porous coating layer has a thickness of 0.1 $\mu$m to 1,000 $\mu$m.

67. The ambiance humidity regulating member according to claim 62, wherein said porous coating layer has an average pore size of 0.001 $\mu$m to 50 $\mu$m.

68. The ambiance humidity regulating member according to claim 62, wherein said porous coating layer is formed of at least one selected from the group consisting of a fluororesin, a polyamide resin, a polyimide resin, a polyester resin, a polystyrene resin, a polyolefin resin, a polycarbonate resin, a polysulfone resin, an acrylic resin, a cellulose resin, a vinyl chloride resin, a polyacetal resin, a polyurethane resin, copolymers thereof, and derivative thereof.

69. The ambiance humidity regulating member according to claim 62, wherein said porous coating layer is colored.

70. A functional ambiance humidity regulating member comprising the ambiance humidity regulating member according to claim 62 and the adsorbent according to claim 1.

71. An ambiance humidity regulating member, comprising core particles containing at least one humidity-regulating material of an acid salt, and a porous coating layer including a polymer material that coats said core particles, wherein the acid salt is at least one of an alkali metal salt, an alkaline earth metal salt, and an ammonium salt.

72. The ambiance humidity regulating member according to claim 71, wherein said humidity regulating material is at least one selected from the group consisting of sodium sulfate, an alkali metal salt of phosphoric acid, an alkali metal salt of hydrogenphosphate, an ammonium salt of phosphoric acid, and an ammonium salt of hydrogen phosphate.

73. The ambiance humidity regulating member according to claim 71, wherein said core particles further contains a hydrophilic polymer compound.

74. The ambiance humidity regulating member according to claim 73, wherein said hydrophilic polymer compound is at least one selected from the group consisting of vinyl alcohol, vinylpyrrolidone, acrylic acid, methacrylic acid, a saponification compound of vinyl acetate, a cellulose ester, an oxyolefin, and a sugar.

75. A functional ambiance humidity regulating member comprising the ambiance humidity regulating member according to claim 71 and the adsorbent according to claim 1.

* * * * *